US012640307B2

(12) United States Patent
Piazza Galarza et al.

(10) Patent No.: US 12,640,307 B2
(45) Date of Patent: May 26, 2026

(54) SYSTEMS FOR ASSEMBLING A MAGNETIC-CORE ASSEMBLY

(71) Applicant: General Electric Company, Schenectady, NY (US)

(72) Inventors: Pablo Gabriel Piazza Galarza, Cincinnati, OH (US); Fabian Isaza-Gomez, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 57 days.

(21) Appl. No.: 18/613,464

(22) Filed: Mar. 22, 2024

(65) Prior Publication Data

US 2024/0274353 A1 Aug. 15, 2024

Related U.S. Application Data

(62) Division of application No. 17/007,099, filed on Aug. 31, 2020, now Pat. No. 11,961,660.

(51) Int. Cl.
| | |
|---|---|
| *H01F 41/02* | (2006.01) |
| *H01F 7/02* | (2006.01) |
| *H01F 27/245* | (2006.01) |
| *H02K 15/03* | (2025.01) |
| *H02K 15/12* | (2025.01) |

(52) U.S. Cl.
CPC .......... *H01F 41/0233* (2013.01); *H01F 7/02* (2013.01); *H01F 27/245* (2013.01); *H02K 15/03* (2013.01); *H02K 15/12* (2013.01)

(58) Field of Classification Search
CPC ...... H01F 41/0233; H01F 7/02; H01F 27/245; H02K 15/03; H02K 15/12
See application file for complete search history.

(56) References Cited

U.S. PATENT DOCUMENTS

| | | | |
|---|---|---|---|
| 5,271,248 A | 12/1993 | Crowe | |
| 5,598,625 A * | 2/1997 | Bluen | .................. H04R 31/006 |
| | | | 29/609.1 |

(Continued)

FOREIGN PATENT DOCUMENTS

| | | | |
|---|---|---|---|
| CN | 107086736 A | 8/2017 | |
| EP | 2493640 B1 | 6/2018 | |
| WO | WO-2020095380 A1 * | 5/2020 | ............. H02K 15/12 |

*Primary Examiner* — Thomas J Hong
*Assistant Examiner* — Jose K Abraham
(74) *Attorney, Agent, or Firm* — Dority & Manning, P.A.

(57) ABSTRACT

A magnetic-core assembling tool may include first and second compression plate alignment guides configured to be respectively fitted to first and second compression plates of a magnetic-core assembly, a plurality of semiannular tension bars, and a clamping plate. The semiannular tension bars may be attached at a first end to the first compression plate alignment guide and at a second end to the clamping plate. The clamping plate may include a plurality of compression shoes configured to apply a variable amount of compression to the magnetic-core assembly. A method of assembling a magnetic-core assembly includes assembling a plurality of lamination stacks, staging the plurality of lamination stacks to provide a magnetic-core assembly, assembling a magnetic-core assembling-tool around the magnetic-core assembly, and injecting magnet retention adhesive into a plurality of magnet retention slots in the magnetic-core assembly housed in the magnetic-core assembling tool.

12 Claims, 20 Drawing Sheets

(56) References Cited

U.S. PATENT DOCUMENTS

| | | | |
|---|---|---|---|
| 5,692,889 A | 12/1997 | Tateno et al. | |
| 5,770,903 A | 6/1998 | Bland et al. | |
| 6,727,609 B2 | 4/2004 | Johnsen | |
| 8,519,577 B2 | 8/2013 | Stiesdal | |
| 8,519,578 B2 | 8/2013 | Pal | |
| 8,875,385 B2 | 11/2014 | Hladnik et al. | |
| 9,205,487 B2 * | 12/2015 | Osborne | B22D 19/0054 |
| 9,287,754 B2 | 3/2016 | Buttner et al. | |
| 9,601,951 B2 | 3/2017 | Salas Nobrega et al. | |
| 9,985,486 B2 | 5/2018 | Asao et al. | |
| 11,146,154 B2 | 10/2021 | Yoshida et al. | |
| 11,258,340 B2 | 2/2022 | Ikeda et al. | |
| 11,264,872 B2 | 3/2022 | Murayama et al. | |
| 11,271,458 B2 | 3/2022 | Jung | |
| 11,489,425 B2 | 11/2022 | Porcher et al. | |
| 2004/0189108 A1 | 9/2004 | Dooley | |
| 2009/0174273 A1 | 7/2009 | Watanabe et al. | |
| 2010/0083486 A1 | 4/2010 | Amano et al. | |
| 2012/0266456 A1 | 10/2012 | Hladnik et al. | |
| 2013/0062973 A1 | 3/2013 | Yoshimura et al. | |
| 2013/0087265 A1 | 4/2013 | Takaichi et al. | |
| 2014/0292132 A1 * | 10/2014 | Kazmin | H02K 1/2706 |
| | | | 310/156.01 |
| 2015/0052737 A1 * | 2/2015 | Ross | H02K 15/02 |
| | | | 29/598 |
| 2017/0025933 A1 | 1/2017 | Fujimaki et al. | |
| 2017/0155309 A1 * | 6/2017 | Jassal | B22F 3/24 |
| 2017/0214300 A1 | 7/2017 | Chung et al. | |
| 2017/0237317 A1 | 8/2017 | Mizukami | |
| 2017/0297078 A1 | 10/2017 | Nishinaka | |
| 2019/0089231 A1 | 3/2019 | Ishimatsu et al. | |
| 2019/0089232 A1 * | 3/2019 | Fukuyama | H02K 15/03 |
| 2019/0103775 A1 | 4/2019 | Kashiwabara et al. | |
| 2019/0259531 A1 | 8/2019 | Okudaria et al. | |
| 2020/0043651 A1 * | 2/2020 | Fukumoto | H02K 15/03 |
| 2020/0099278 A1 | 3/2020 | Fukuyama et al. | |
| 2020/0112237 A1 * | 4/2020 | Yoshida | H02K 15/03 |
| 2021/0194338 A1 | 6/2021 | Ikeda et al. | |
| 2021/0234441 A1 * | 7/2021 | Ikeda | H01F 41/02 |

* cited by examiner

252
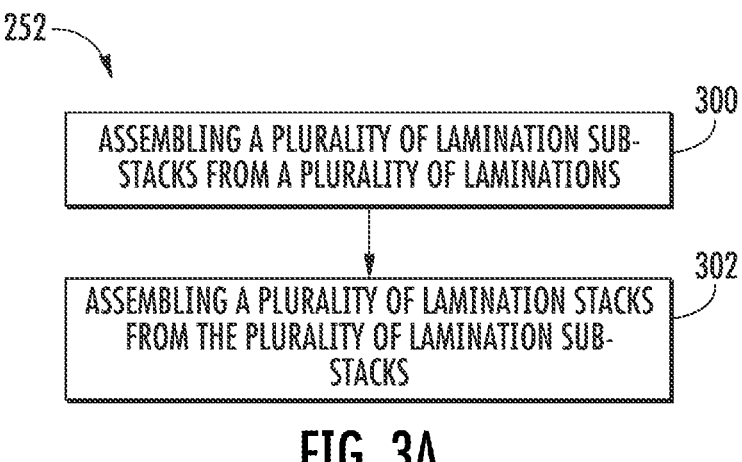
ASSEMBLING A PLURALITY OF LAMINATION SUB-STACKS FROM A PLURALITY OF LAMINATIONS — 300
ASSEMBLING A PLURALITY OF LAMINATION STACKS FROM THE PLURALITY OF LAMINATION SUB-STACKS — 302
FIG. 3A
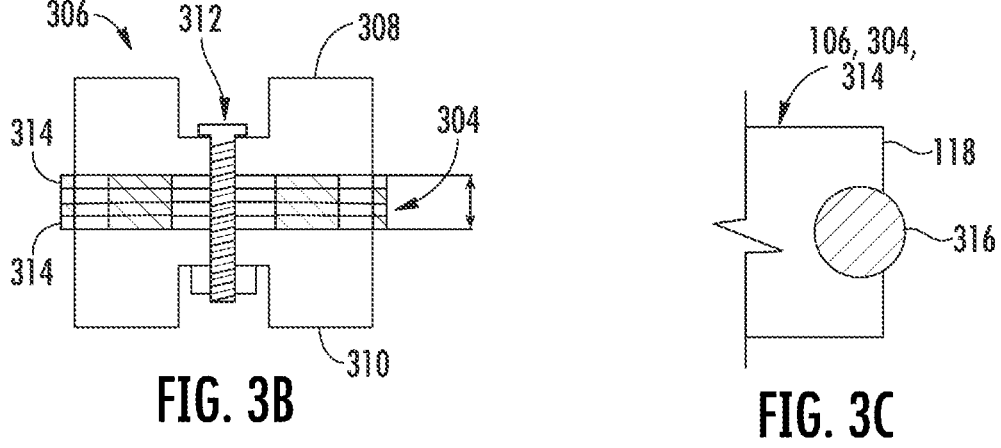
FIG. 3B
FIG. 3C
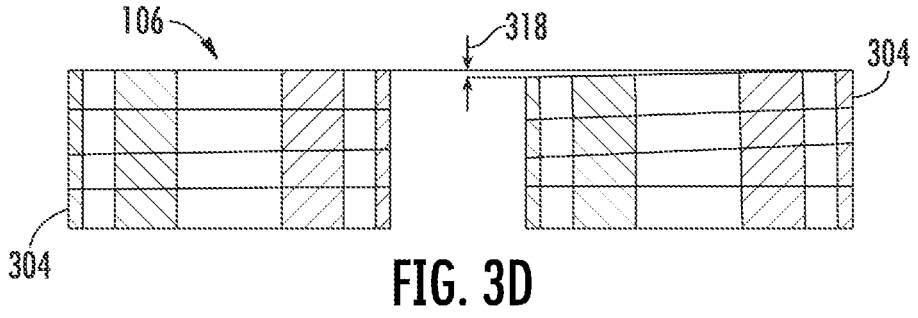
FIG. 3D

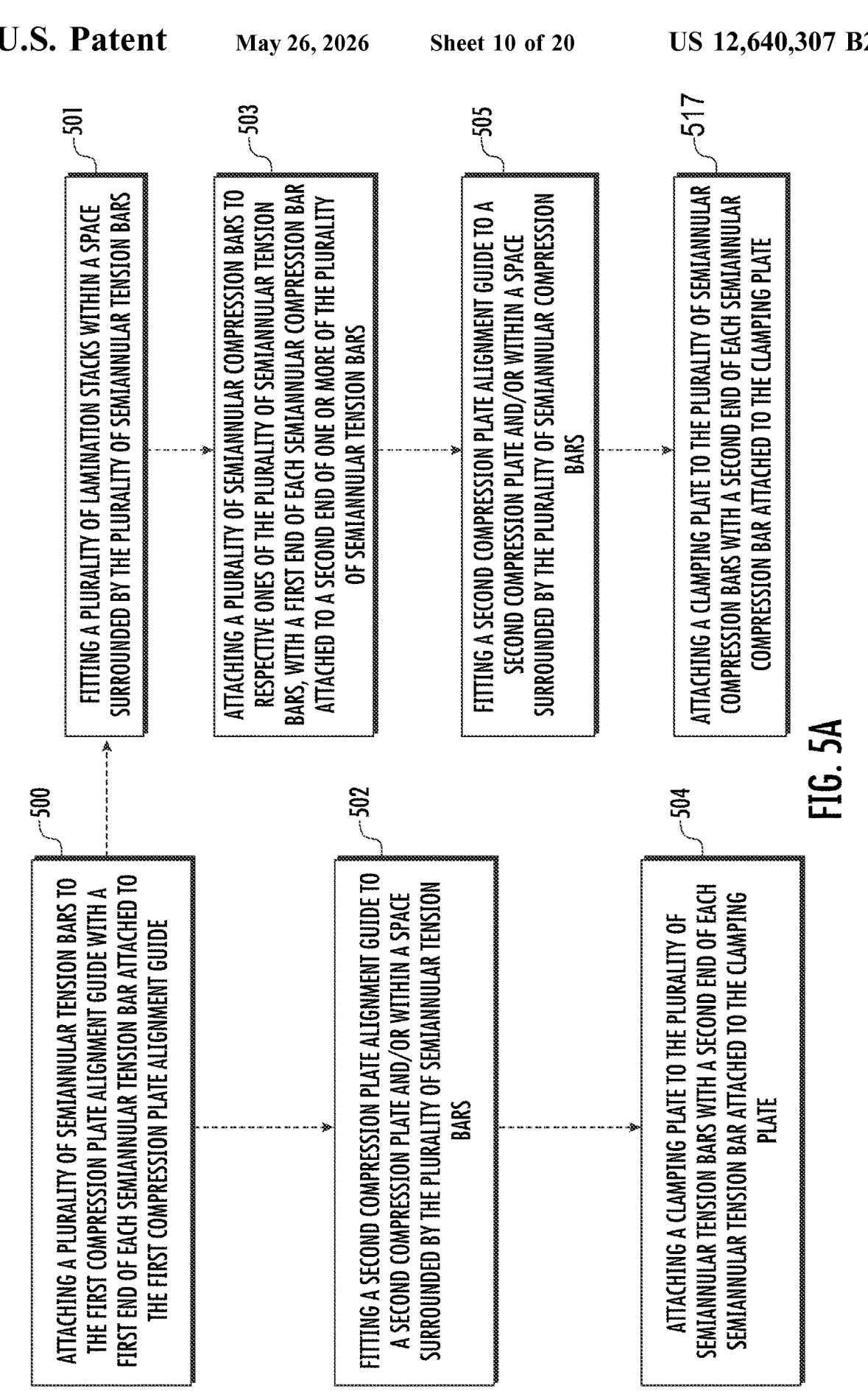

ATTACHING A PLURALITY OF SEMIANNULAR TENSION BARS TO THE FIRST COMPRESSION PLATE ALIGNMENT GUIDE WITH A FIRST END OF EACH SEMIANNULAR TENSION BAR ATTACHED TO THE FIRST COMPRESSION PLATE ALIGNMENT GUIDE
500

FITTING A PLURALITY OF LAMINATION STACKS WITHIN A SPACE SURROUNDED BY THE PLURALITY OF SEMIANNULAR TENSION BARS
501

FITTING A SECOND COMPRESSION PLATE ALIGNMENT GUIDE TO A SECOND COMPRESSION PLATE AND/OR WITHIN A SPACE SURROUNDED BY THE PLURALITY OF SEMIANNULAR TENSION BARS
502

ATTACHING A PLURALITY OF SEMIANNULAR COMPRESSION BARS TO RESPECTIVE ONES OF THE PLURALITY OF SEMIANNULAR TENSION BARS, WITH A FIRST END OF EACH SEMIANNULAR COMPRESSION BAR ATTACHED TO A SECOND END OF ONE OR MORE OF THE PLURALITY OF SEMIANNULAR TENSION BARS
503

ATTACHING A CLAMPING PLATE TO THE PLURALITY OF SEMIANNULAR TENSION BARS WITH A SECOND END OF EACH SEMIANNULAR TENSION BAR ATTACHED TO THE CLAMPING PLATE
504

FITTING A SECOND COMPRESSION PLATE ALIGNMENT GUIDE TO A SECOND COMPRESSION PLATE AND/OR WITHIN A SPACE SURROUNDED BY THE PLURALITY OF SEMIANNULAR COMPRESSION BARS
505

ATTACHING A CLAMPING PLATE TO THE PLURALITY OF SEMIANNULAR COMPRESSION BARS WITH A SECOND END OF EACH SEMIANNULAR COMPRESSION BAR ATTACHED TO THE CLAMPING PLATE
517

INJECTING MAGNET RETENTION ADHESIVE INTO ONE OR MORE ADHESIVE INJECTION PORTS IN A COMPRESSION PLATE

602

FLOWING THE MAGNET RETENTION ADHESIVE THROUGH AN ADHESIVE CONDUIT IN THE COMPRESSION PLATE AND INTO ONE OR MORE MAGNET RETENTION SLOTS PASSING THROUGH A PLURALITY OF LAMINATION STACKS OF THE MAGNETIC-CORE ASSEMBLY

260

| 620 |
| :--- |
| PASSING A MACHINING TOOL THROUGH AN ANNULAR PASSAGEWAY DEFINED BY AN INNER SURFACE OF THE MAGNETIC-CORE ASSEMBLING TOOL |

| 622 |
| :--- |
| MACHINING AN INWARD FACING SURFACE OF THE MAGNETIC-CORE ASSEMBLY USING THE MACHINING TOOL |

| 624 |
| :--- |
| REMOVING THE MAGNETIC CORE ASSEMBLY FROM THE MAGNETIC-CORE ASSEMBLING TOOL WITH THE MAGNETIC-CORE ASSEMBLY AT AN AMBIENT TEMPERATURE |

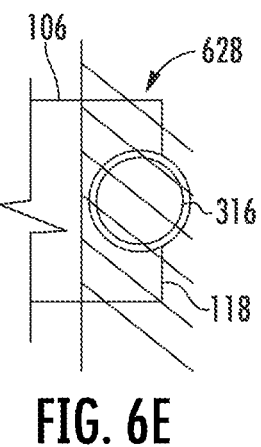

HEATING THE MAGNETIC-CORE ASSEMBLY AND THE MAGNETIC-CORE ASSEMBLING TOOL TO A PRESCRIBED THERMAL EXPANSION TEMPERATURE — 632

COOLING A ROTOR SHAFT TO A PRESCRIBED THERMAL CONTRACTION TEMPERATURE — 634

INSERTING THE ROTOR SHAFT THROUGH AN ANNULAR ROTOR SHAFT-RECEIVING SPACE OF THE MAGNETIC-CORE ASSEMBLY — 636

REMOVING THE MAGNETIC-CORE ASSEMBLY FROM THE MAGNETIC-CORE ASSEMBLING TOOL WITH THE MAGNETIC-CORE ASSEMBLY AND THE ROTOR SHAFT AT AN AMBIENT TEMPERATURE — 638

FIG. 6F

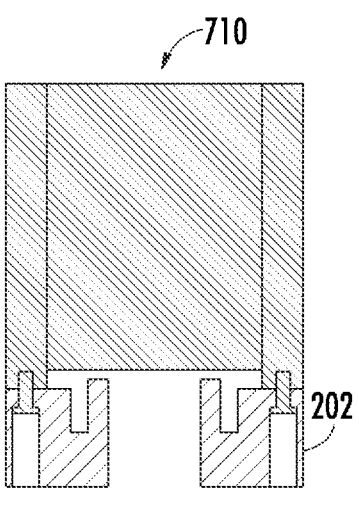
FIG. 7B
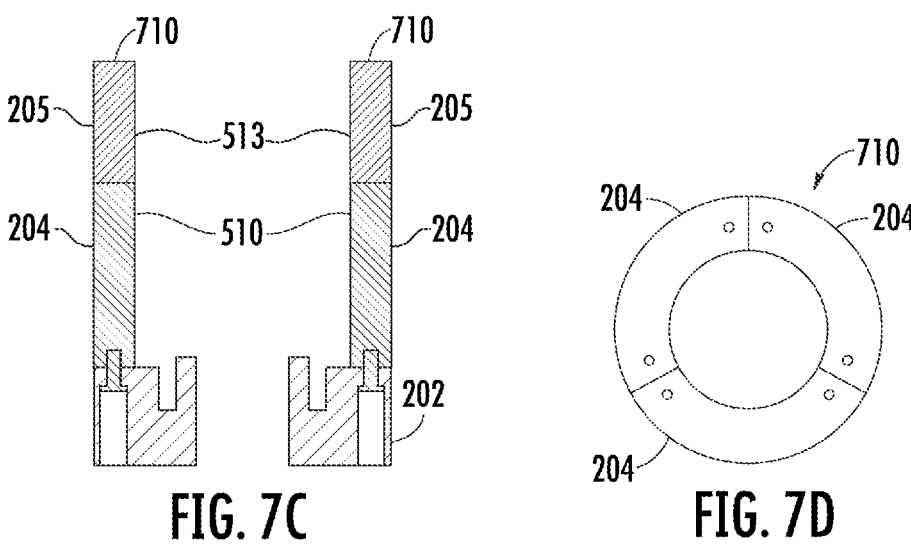
FIG. 7C
FIG. 7D
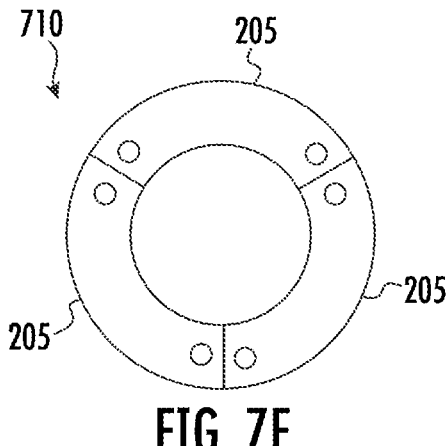
FIG. 7E

SYSTEMS FOR ASSEMBLING A MAGNETIC-CORE ASSEMBLY

CROSS-REFERENCE TO RELATED APPLICATIONS

This application is a Divisional application of U.S. application Ser. No. 17/007,099 filed Aug. 31, 2020, which is hereby incorporated by reference in its entirety.

FIELD OF TECHNOLOGY

The present disclosure pertains generally to magnetic-core assembling tools, and systems and methods for assembling a magnetic-core assembly.

BACKGROUND

Magnetic-cores are widely used in electric machines such as electric motors and generators. For example, a magnetic-core may be used in a rotor core assembly and/or in a stator core assembly. An electric machine utilizes a magnetic field to convert electrical energy to mechanical energy, or vice versa. The magnetic field may be provided by an array of permanent magnets and/or an electromagnetic coil. The use of a magnetic-core increases the strength of a magnetic field by orders of magnitude from what it would be without the core. Typically steel alloys such as silicon steel are used for the magnetic-core because these materials have a high relative permeability, which reflects the material's magnetic flux carrying capacity or the degree of magnetization that the material obtains in response to an applied magnetic field. However, magnetic-cores made of steel alloys are susceptible to forming eddy currents as a result of the alternating flux induced during operation of the electric machine. These eddy currents generate resistive losses, generating heat which, among other things, reduces the efficiency of the electric machine.

Eddy currents can be minimized to an extent relative to solid magnetic-cores by using magnetic-cores made of stacks of thin sheets of steel alloy coated or laminated with a thin film of non-ferromagnetic insulating material. Each individual laminated sheet is commonly referred to as a lamination. The film of insulating material coating the thin sheet of steel alloy serves as a barrier to eddy currents, such that eddy currents can only flow in narrow loops within the thickness of the individual laminations. The current in an eddy current loop is proportional to the area of the loop, so thinner laminations generally correspond to relatively lower eddy current losses. As such, it is generally desirable to provide thinner laminations so as to minimize eddy current losses.

A typical magnetic-core may have hundreds of even thousands of laminations tightly clamped together between compression plates to minimize the amount of space between the laminations. Proper operation and performance of a magnetic-core depends on having precisely stacked laminations, including having uniform alignment and compression throughout the magnetic-core. Imprecisions in a lamination stack, such as imprecisions introduced when stacking the laminations can lead to performance issues, premature wear, and even critical failures due to electrical, mechanical, and thermal stresses. For example, improper alignment or clamping can cause movement and vibration between the laminations, leading to settling of laminations, imbalances, excessive temperatures, buckling, and even meltdown of the magnetic-core. These issues may arise even with minute imprecisions. For example, even minute imprecisions may cause variations in the electromagnetic flux. Variations in the electromagnetic flux may cause magnetostrictive strain, which may oscillate at twice the frequency of the magnetic field. This magnetostrictive strain may cause movement and vibration between the laminations. When laminations move relative to each other, the film of insulating material coating the laminations may wear, leading to shorts, magnetic field imbalances, overheating, and potentially catastrophic failures.

Specialized assembly tools have been provided for assembling magnetic-cores. However, imprecisions and corresponding issues nevertheless persist. Efforts to address these issues include applying adhesives across the face of laminations to adhere them to one another, as well as welding laminations together. However, these approaches are not often ideal because they increase manufacturing time and cost, and add material that does not contribute to the magnetic flux carrying capacity of the magnetic-core.

Accordingly, there exists a need for improved magnetic-core assembling tools, and improved systems and methods assembling a laminated magnetic-core.

BRIEF DESCRIPTION

Aspects and advantages will be set forth in part in the following description, or may be obvious from the description, or may be learned through practicing the presently disclosed subject matter.

In one aspect, the present disclosure embraces methods of assembling a magnetic-core assembly. Exemplary methods may include assembling a plurality of lamination stacks, staging the plurality of lamination stacks to provide a magnetic-core assembly, assembling a magnetic-core assembling-tool around the magnetic-core assembly, and injecting magnet retention adhesive into a plurality of magnet retention slots in the magnetic-core assembly housed in the magnetic-core assembling tool.

In another aspect, the present disclosure embraces magnetic-core assembling tools. An exemplary magnetic-core assembling tool may include a first compression plate alignment guide configured to be fitted to a first compression plate of a magnetic-core assembly, a second compression plate alignment guide configured to be fitted to a second compression plate of the magnetic-core assembly, a plurality of semiannular tension bars, and a clamping plate. Each of the plurality of semiannular tension bars have a first end and a second end, with the first end configured to attach to the first compression plate alignment guide and the second end configured to attach to the clamping plate. The clamping plate may include a plurality of compression shoes, each of the plurality of compression shoes configured to apply a variable amount of compression to the magnetic-core assembly.

In another aspect, the present disclosure embraces magnetic-core assemblies. Exemplary magnetic-core assemblies may include a magnetic-core comprising a plurality of laminations clamped between a first compression plate and a second compression plate, a plurality of permanent magnets within a plurality of magnet retention slots in the laminations, and a magnet retention adhesive adhering the plurality of permanent magnets within the plurality of magnet retention slots. The magnet retention adhesive may be applied with the lamination stacks under axial compression applied by a magnetic-core assembling tool, substantially preventing magnet retention adhesive from flowing across the face of the laminations.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 3A shows a flowchart depicting an exemplary sequence of steps for assembling a plurality of lamination stacks for a magnetic-core assembly;

FIG. 3B schematically depicts a stack assembling-tool with a lamination sub-stack assembled from a plurality of laminations housed therein;

FIG. 3C schematically depicts a location for applying adhesive when assembling a lamination sub-stack from a plurality of laminations and/or when assembling a lamination stack from a plurality of lamination sub-stacks;

FIG. 3D schematically depicts an exemplary lamination stack assembled from a plurality of lamination sub-stacks;

FIG. 5A shows a flowchart depicting an exemplary sequence of steps for assembling a magnetic-core assembling tool around a magnetic-core assembly;

FIG. 6E schematically depicts removal of the adhesive of FIG. 3C during the machining operation of FIGS. 6C and 6D;

FIG. 6F shows a flowchart depicting an exemplary sequence of steps for installing a rotor shaft at the inner diameter of a magnetic-core assembly housed in a magnetic-core assembling tool;

FIGS. 7B-7E schematically depict an exemplary sequence for fabricating a magnetic-core assembling tool.

Figure 1A:
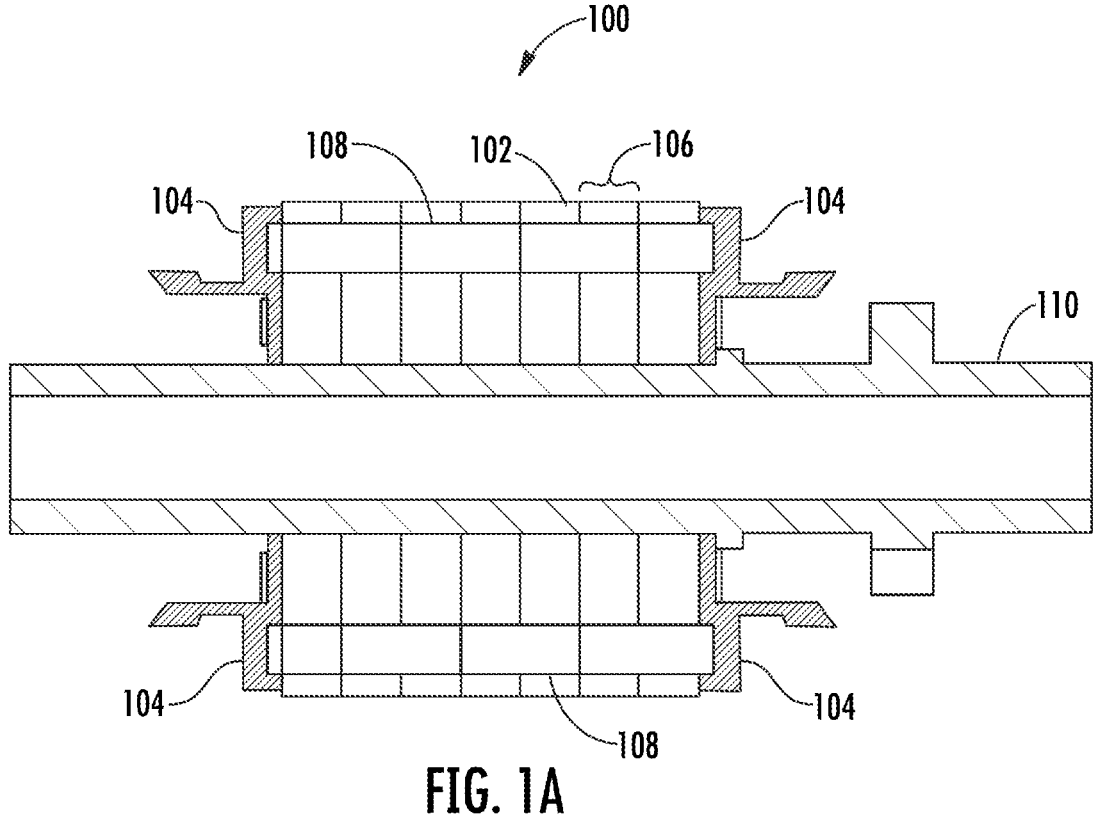
FIG. 1A schematically depicts a cross-sectional view of an exemplary magnetic-core assembly for an electric machine.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The present disclosure generally provides improved magnetic-core assemblies, magnetic-core assembling tools, and systems and methods for assembling a magnetic-core assembly. The presently disclosed tools, systems, and methods help to improve staging and alignment with of a magnetic-core assembly and to maintain proper compression and alignment of the magnetic-core assembly, thereby reducing the possibility of warping, shifting of laminations, or damage to the magnetic-core assembly. The presently disclosed magnetic-core assembling tools provide systems for staging, assembling, aligning, and compressing the components of the magnetic-core assembly with improved precision and tighter tolerances. Additionally, the presently disclosed magnetic-core assembling tools provide systems for performing assembly steps to a magnetic-core assembly housed in a magnetic-core assembling tool, such as injecting magnet retention adhesive into magnet retention slots of a magnetic-core assembly, performing machining operations upon a magnetic-core assembly, and/or coupling a rotor shaft to a magnetic-core assembly. These assembly steps can be performed without removing the magnetic-core assembly from the magnetic-core assembling tool. Additionally, these assembly steps can be performed while maintaining the magnetic-core assembly under constant axial pressure.

With the presently disclosed tools, systems, and methods, a magnetic-core assembly can be provided that has an improved relative permeability. The relative permeability of a magnetic-core depends on how closely and uniformly the laminations that make up the magnetic-core are clamped together. This closeness and uniformity of the laminated magnetic-core can be characterized by a lamination factor, S, in accordance with ASTM 719, Standard Test Method for Lamination Factor of Magnetic Materials. Lamination factor may also be referred to as a space factor or stacking factor. Lamination factor indicates the deficiency of effective steel volume due to the presence of oxides, roughness, insulating coatings, and other conditions affecting the steel surface of the laminations making up a magnetic-core. Accordingly, the presently disclosed tools, systems, and methods can provide magnetic-core assemblies that have an improved lamination factor. By way of example, magnetic-core assemblies may have a lamination factor of greater than 0.8, such as at least 0.9, such as at least 0.95, such as at least 0.96, such as at least 0.97, such as at least 0.98, such as at least 0.99.

FIG. 1A schematically depicts a magnetic-core assembly 100 for an electric machine. The magnetic-core assembly 100 includes a magnetic-core 102 made up of a plurality of laminations clamped between compression plates 104. The plurality of laminations making up the magnetic-core 102 may be provided as a plurality of lamination stacks 106. The magnetic-core 102 may include a plurality of permanent magnets 108, or electromagnetic windings. As discussed with reference to FIGS. 3A-3D, each lamination stack 106 may include a plurality of lamination sub-stacks, and each lamination sub-stack may include a plurality of individual laminations. As shown, the magnetic-core assembly 100 may be a rotor core assembly for an electric machine, since the magnetic-core assembly 100 includes a rotor shaft 110 operably coupled to the rotor core. However, the present disclosure embraces any magnetic-core assembly 100, including rotor core assemblies and stator core assemblies, among others, and the inclusion of the rotor shaft 110 should not be interpreted as limiting the present disclosure. For example, it will be appreciated that by elimination of the rotor shaft 110, the exemplary magnetic-core assembly 100 as shown may additionally or alternatively reflect a stator core assembly, among other magnetic-core assemblies.

Figure 1B:
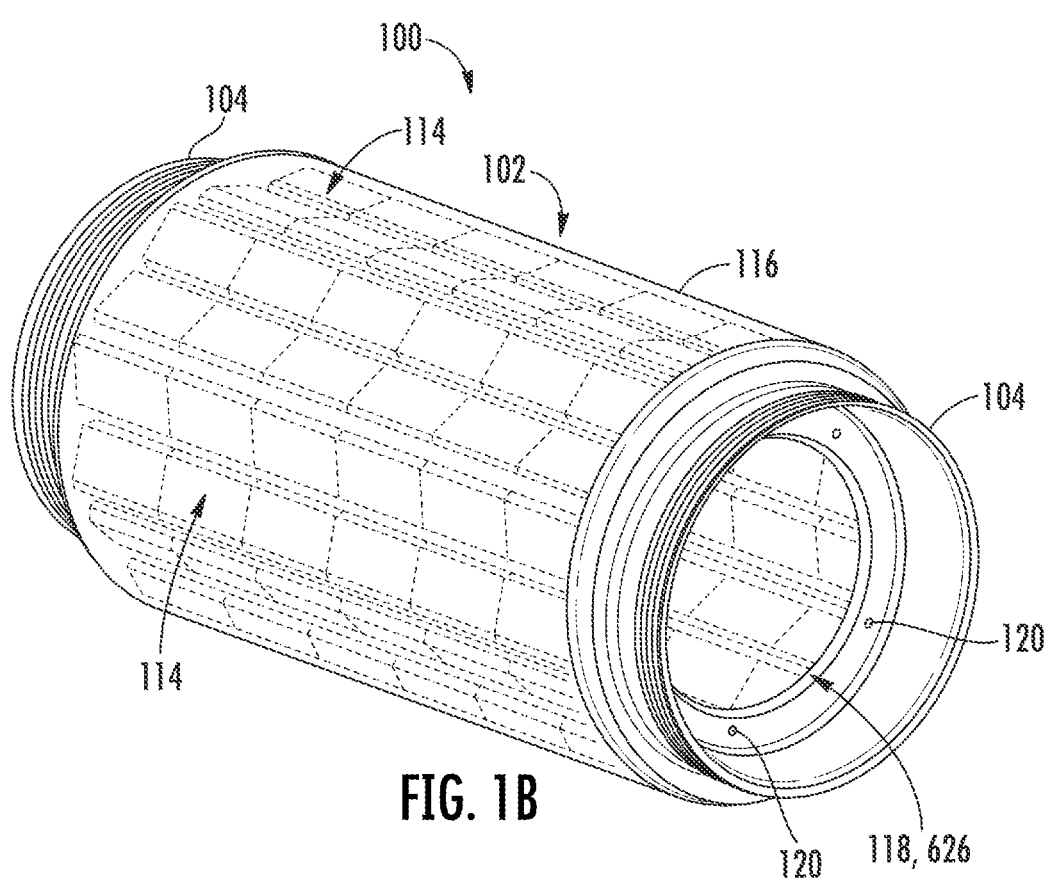
FIG. 1B schematically depicts a perspective view of an exemplary magnetic-core assembly.
Figure 1C:
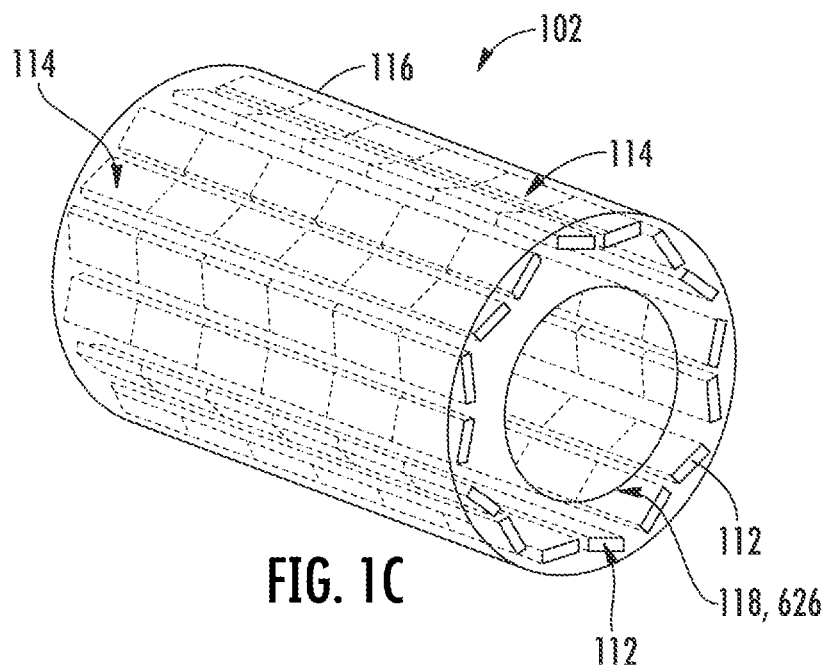
FIG. 1C schematically depicts a perspective view of the exemplary magnetic-core assembly of FIG. 1B with the compression plates removed to show magnet retention slots in the magnetic-core.
Figure 1D:
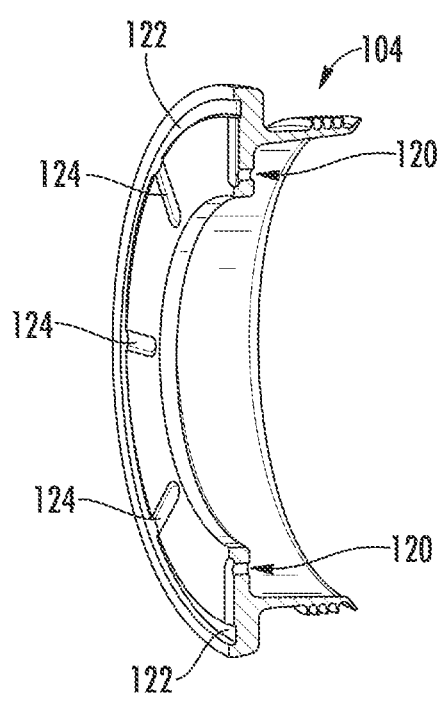
FIG. 1D schematically depicts a perspective cross-sectional view of a compression plate from the magnetic-core assembly of FIG. 1B.
Figure 1E:
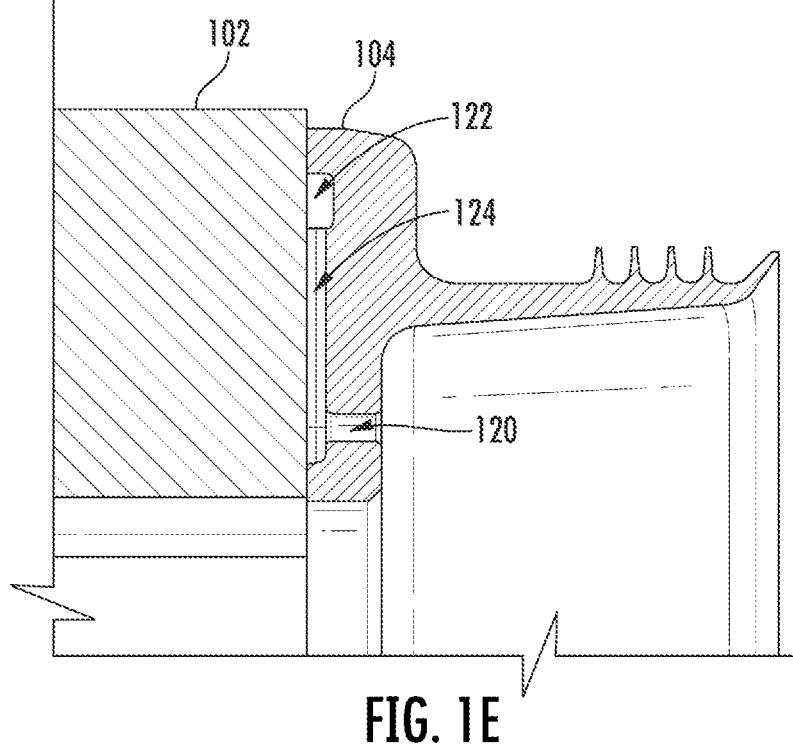
FIG. 1E schematically depicts a close-up cross-sectional view of a compression plate on the magnetic-core assembly of FIG. 1B.

Another embodiment of an exemplary magnetic-core assembly 100 is shown in FIGS. 1B and 1C. As shown in FIG. 1B, the exemplary magnetic-core assembly 100 includes a magnetic-core 102 made up of a plurality of laminations (e.g., lamination stacks and/or lamination sub-stacks) clamped between compression plates 104. The laminations making up the magnetic-core 102 include one or more outward facing surfaces 116, and one or more inward facing surfaces 118. FIG. 1C shows the exemplary magnetic-core assembly 100 of FIG. 1B, but with the compression plates 104 removed to show a plurality of magnet retention slots 112 which hold a plurality of permanent magnets 108 and/or a plurality of permanent magnet segments 114. As shown in FIGS. 1D and 1E, exemplary compression plates 104 include one or more injection ports 120, which lead to an adhesive conduit 122 that defines a pathway for flowing magnet retention adhesive into the plurality of magnet retention slots 112 in the magnetic-core 102. In some embodiments, the adhesive conduit 122 includes a plurality of magnet retention grooves 124. The plurality of magnet retention grooves 124 may be interconnected, defining at least a portion of the adhesive conduit 122. Alternatively, the plurality of magnet retention grooves 124 may each separately define at least a portion of an adhesive conduit 122. The one or more injection ports 120 may be used to inject magnet retention adhesive, as discussed below with reference to FIGS. 6A and 6B.

Figure 2A:
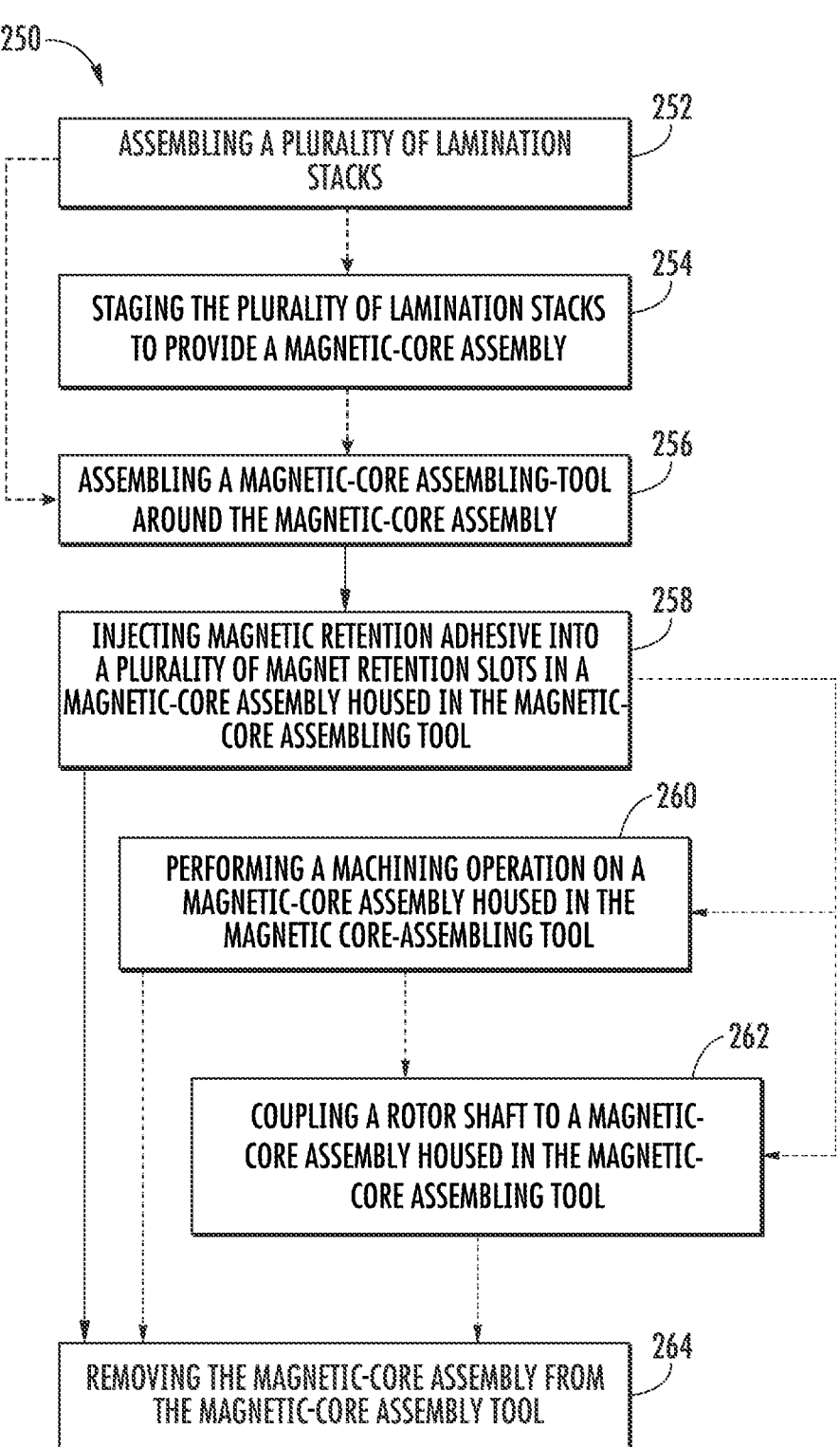
FIG. 2A shows a flowchart depicting an exemplary sequence of steps for assembling a magnetic-core assembly at least in part using a magnetic-core assembling tool.
Figure 2B:
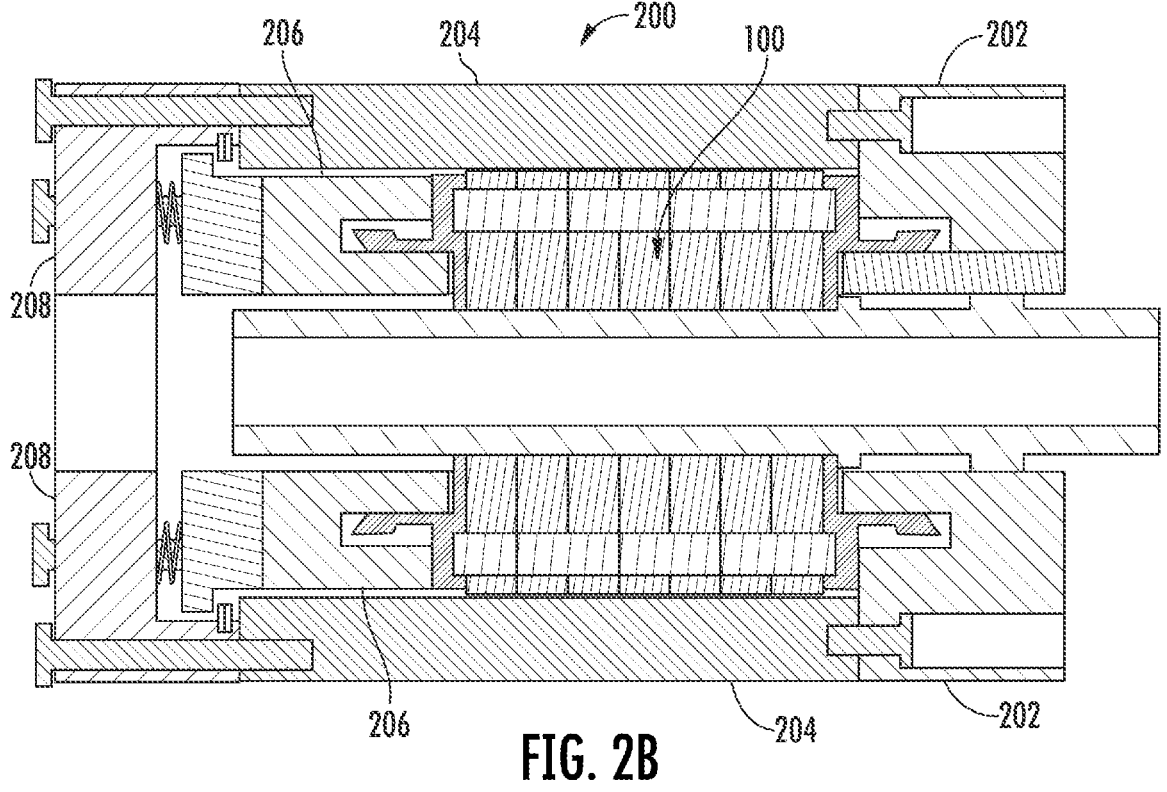
FIG. 2B schematically depicts an exemplary magnetic-core assembling tool with the magnetic-core assembly of FIG. 1A housed therein.
Figure 2C:
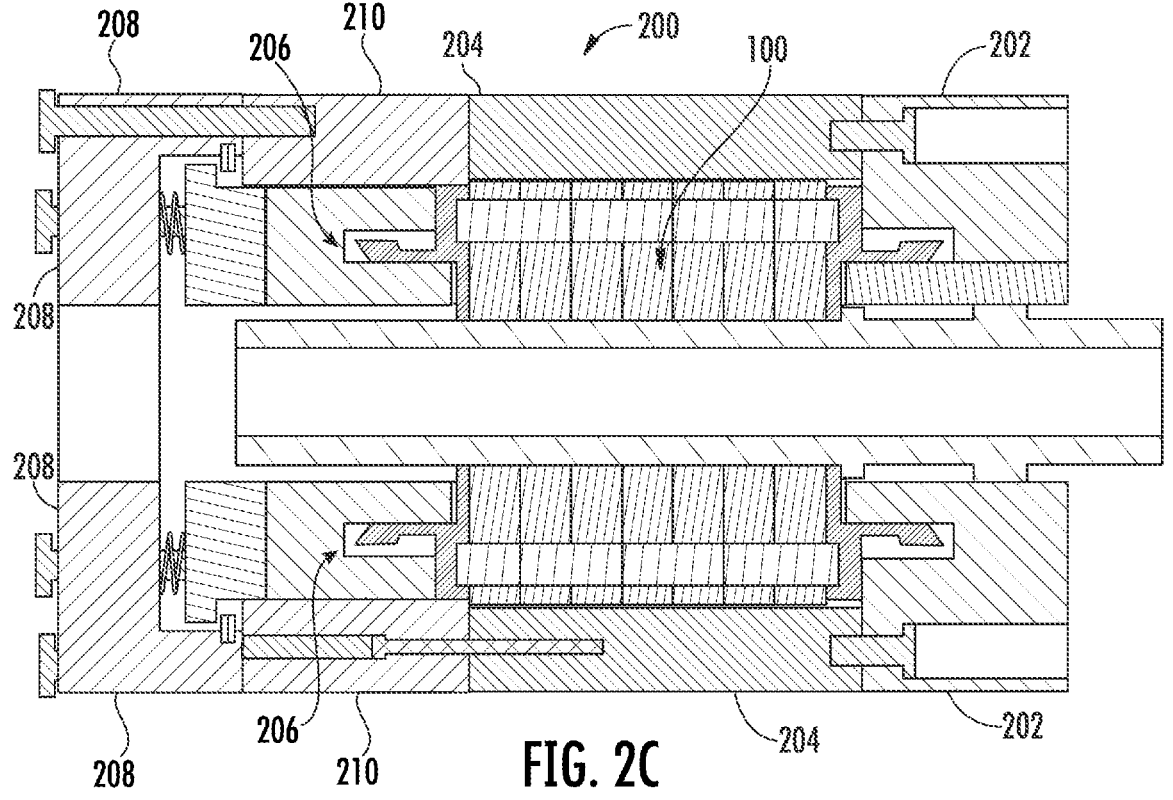
FIG. 2C schematically depicts another exemplary magnetic-core assembling tool with the magnetic-core assembly of FIG. 1A housed therein.

FIG. 2A shows flowchart depicting an exemplary method 250 of assembling a magnetic-core assembly 100 at least in part using a magnetic-core assembling tool 200. FIGS. 2B and 2C respectively show an exemplary magnetic-core assembling tool 200 with the magnetic-core assembly 100 of FIG. 1A housed therein. As shown in FIG. 2B, an exemplary magnetic-core assembling tool 200 may include a first compression plate alignment guide 202, a plurality of semi-annular tension bars 204, a second compression plate alignment guide 206, and a clamping plate 208. As shown in FIG. 2C, an exemplary magnetic-core assembling tool 200 may additionally include a plurality of semiannular compression bars 205 disposed between the plurality of semiannular tension bars 204 and the clamping plate 208. The magnetic-core assembling tool 200 may be assembled using the method depicted in FIG. 2A. The exemplary method 250 may include assembling a plurality of lamination stacks 106 (block 252). The exemplary method may optionally include staging a plurality of lamination stacks 106 to provide a magnetic-core assembly 454 (FIG. 4H) (block 254). The exemplary method 250 may additionally or alternatively include assembling a magnetic-core assembling tool 200 around a magnetic-core assembly 454 (block 256). For example, the magnetic core assembling tool 200 may be assembled around a staged magnetic core assembly 100. Additionally, or in the alternative, the magnetic core assembling tool 200 may be assembled while concurrently staging the magnetic core assembly 100. The exemplary method 250 may include injecting magnet retention adhesive into a plurality of magnet retention slots 112 in the magnetic-core assembly 454 housed in the magnetic-core assembling tool 200 (block 258). The exemplary method 250 may optionally include performing a machining operation on the magnetic-core assembly 454 housed in the magnetic-core assembling tool 200 (block 260), and/or coupling a rotor shaft 110 to the magnetic-core assembly 454 housed in the magnetic-core assembling tool 200 (block 262). The exemplary method 250 may include removing the magnetic-core assembly 100 from the magnetic-core assembling tool 200 (block 264). The exemplary magnetic-core assembling tool 200 and the exemplary method 250 are discussed in further detail below with reference to FIGS. 4A-4H, 5A-5I, 6A-6H, and 7A-7E.

Typically a magnetic-core 102 includes a plurality of lamination stacks 106 tightly clamped together between compression plates 104. An exemplary method 250 of assembling a magnetic-core assembly 100 may include assembling a plurality of lamination stacks 106 (block 252), for example, as discussed below with reference to FIGS. 3A-3D. The lamination stacks 106 can be subsequently combined together to assemble a magnetic-core assembly 100 as described herein. A magnetic-core 102 may include thousands of individual laminations. As shown in FIG. 3A, a method 252 of assembling a plurality of lamination stacks 106 (block 252 of FIG. 2B) includes assembling a plurality of lamination sub-stacks from a plurality of laminations (block 300), and then assembling a plurality of lamination stacks 106 from the plurality of lamination sub-stacks (block 302).

As shown in FIG. 3B, a lamination sub-stack 304 may be assembled using a stack assembling-tool 306. The stack assembling-tool 306 includes a first clamping member 308, a second clamping member 310, and a compression member 312 configured to apply compression force to a plurality of laminations 314 clamped between the first clamping member 308 and the second clamping member 310. The compression member 312 may be driven by a hydraulic press, manual actuation, or the like, applying clamping pressure to the plurality of laminations 314.

A plurality of laminations 314 are placed in the stack assembling-tool 306, and optionally a small bead of tacking adhesive 316 may be applied at select locations. For example, as shown in FIG. 3C, tacking adhesive 316 may be applied at one or more locations at the inward facing surfaces 118 of the laminations 314. Any suitable thermoplastic material may be used as a tacking adhesive 316 may be used. The tacking adhesive 316 temporarily holds the laminations 314 in position, and may be removed at subsequent points in the assembly of the magnetic-core assembly 100. The plurality of laminations 314 are aligned using a micrometer or the like and clamped tightly together in the stack assembly-tool 306. The clamping pressure applied to the plurality of laminations 314 may range from 0.5 to 2.5 megapascal. After the tacking adhesive 316 has set, the plurality of laminations 314 are removed from the stack assembly-tool 306, providing a lamination sub-stack 304. A lamination sub-stack 304 may include any number of laminations 314. For example, a lamination sub-stack 304 may include between 2 to 100 laminations 314, between 2 to 50 laminations 314, between 2 to 25 laminations 314, or between 2 to 10 laminations 314.

A plurality of lamination sub-stacks 304 can be formed, which can be subsequently combined together to form a lamination stack 106 as shown in FIG. 3D. A lamination stack 106 may be assembled using a stack assembling-tool 306 as shown in FIG. 3B. A plurality of lamination sub-stacks 304 are placed in the stack assembling-tool 306, and optionally a small bead of tacking adhesive 316 may be applied at select locations. For example, as shown in FIG. 3C, tacking adhesive 316 may be placed at one or more locations at the inward facing surface 118 of the lamination sub-stacks 304. Any suitable thermoplastic material may be used as a tacking adhesive 316 may be used, such as the same thermoplastic material used as a tacking adhesive 316 used to adhere the laminations 314 when assembling the lamination sub-stacks 304. The tacking adhesive 316 temporarily holds the lamination sub-stacks 304 in position, and may be removed at subsequent points in the assembly of the magnetic-core assembly 100.

The plurality of laminations sub-stacks 304 can be aligned using a micrometer or the like and clamped tightly together in the stack assembly-tool 306. The clamping pressure applied to the plurality of lamination sub-stacks 304 may range from 0.5 to 2.5 megapascal. After the tacking adhesive 316 has set, the plurality of lamination sub-stacks 304 can be removed from the stack assembly-tool 306, providing a lamination stack 106. A lamination stack 106 may include any number of lamination sub-stacks 304. For example, a lamination stack 106 may include between 2 to 1000 lamination sub-stacks 304, between 2 to 500 lamination sub-stacks 304, between 2 to 100 lamination sub-stacks 304, between 2 to 50 lamination sub-stacks 304, between 2 to 25 lamination sub-stacks 304, or between 2 to 10 lamination sub-stacks 304.

In an exemplary embodiment, the lamination sub-stacks 304 can be measured at various locations, using a micrometer or the like. These measurements may be recorded, for example, in a database associating the measurement values to the lamination sub-stack 304 and the location on the lamination sub-stack 304 corresponding to the measurement. For example, a lamination sub-stack may be measured for thickness, alignment, cylindricity, concentricity, perpendicularity, parallelism, and/or angularity, and the like. Lamination stacks 106 may be selectively assembled from a plurality of lamination sub-stacks 304 selected based at least in part on such measurement values. The lamination sub-stacks 304 may be selectively added to a lamination stack 106 being assembled such that variations in the lamination sub-stacks 304 at least partially offset one another. For example, a plurality of lamination sub-stacks 304 with a variation in thickness may be added to the lamination stack 106 such that the variations in thickness are distributed throughout the lamination stack 106. Such variations may be distributed periodically, uniformly, or evenly throughout the lamination stack 106. Such distributed variations may at least partially offset one another, keeping variation in the resulting lamination stack 106 within an acceptable tolerance range 318. In some embodiments, variations in the lamination sub-stacks 304 may become unapparent in the resulting lamination stack 106.

Referring to FIG. 2A, an exemplary method 250 of assembling a magnetic-core assembly 100 may include staging the magnetic-core assembly 100 (block 254). An exemplary method 250 may include assembling a magnetic-core assembling tool 200 around the magnetic-core assembly 454 (block 256). In some embodiments, a magnetic-core assembly 454 can be staged as discussed below with reference to FIGS. 4A-4H. A magnetic-core assembling tool 200 can be assembled around a staged magnetic-core assembly 454. Additionally, or in the alternative, a magnetic-core assembling tool 200 can be assembled around a magnetic-core assembly 454 while concurrently staging the magnetic core assembly 100, as discussed below with reference to FIGS. 5A-5J. The magnetic core assembly 100 may be compressed using the magnetic-core assembling tool 200 as discussed below with reference to FIGS. 5K and 5L.

Figure 4A:
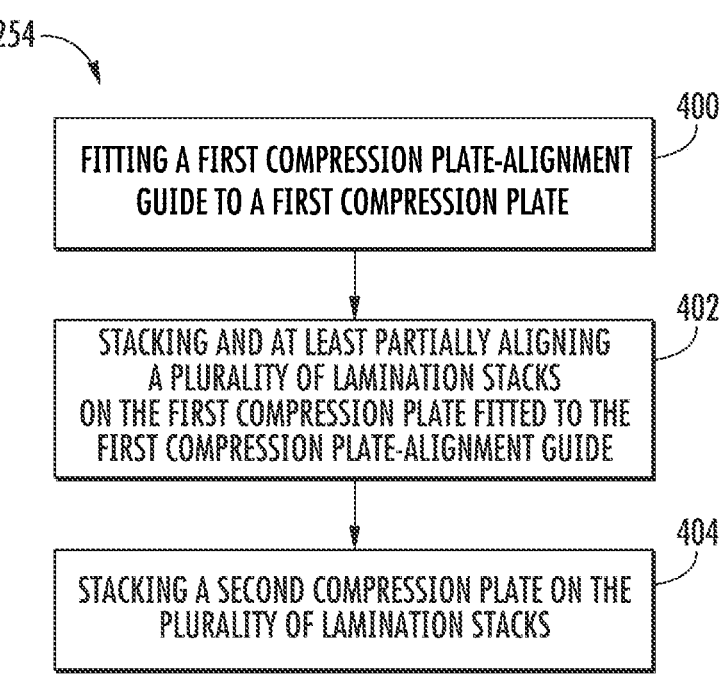
FIG. 4A shows a flowchart depicting an exemplary sequence of steps for staging a plurality of lamination stacks to provide a magnetic-core assembly.

As shown in FIG. 4A, a method 254 of staging a plurality of lamination stacks 106 to provide a magnetic-core assembly 454 (block 254 of FIG. 2B) may include fitting a first compression plate alignment guide 202 to a first compression plate 104 (block 400), stacking and at least partially aligning a plurality of lamination stacks on the first compression plate 104 fitted to the first compression plate alignment guide 202 (block 402), and stacking a second compression plate 104 on the plurality of lamination stacks (block 404).

Figure 4B:
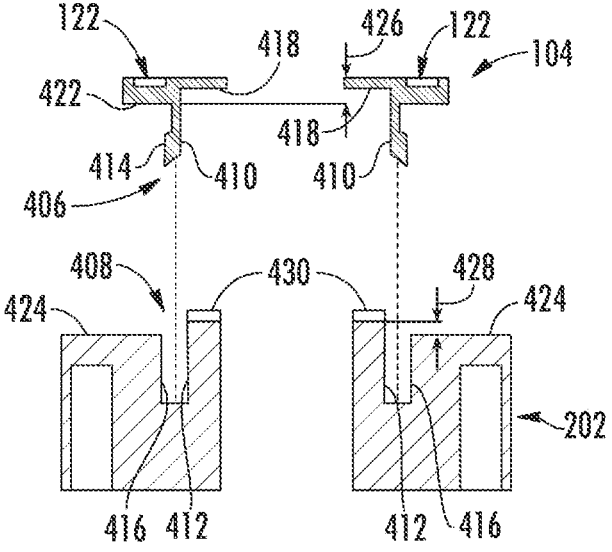
FIGS. 4B-4H schematically depict respective steps of a sequence for staging a plurality of lamination stacks to provide a magnetic-core assembly.

As shown in FIG. 4B, a magnetic-core assembling tool 200 includes a first compression plate alignment guide 202 configured to mate with a compression plate 104. The compression plates 104 of a magnetic-core assembly 100 are fabricated with precise dimensions. For example, typical tolerances for compression plates 104 may be from 0 to 25 mils, such as from 0 to 15 mils, such as from 0 to 10 mils, such as from 0 to 5 mils. In the case of a rotor core, the compression plates 104 rotate with the rotor core assembly. Precise fabrication of the compression plates 104 helps assure that the compression plates 104 do not contribute to imbalances in the magnetic-core assembly 100. This precision allows the compression plates 104 to serve as a reference point for aligning the plurality of lamination stacks 106 when staging and assembling the magnetic-core assembly 100 using the magnetic-core assembling tool 200. The magnetic-core assembling tool 200 may be similarly fabricated with precise dimensions at least at surfaces that contact and align the compression plates 104 and/or the lamination stacks 106. For example, typical tolerances for the magnetic-core assembling tool 200 may be from 0 to 25 mils, such as from 0 to 15 mils, such as from 0 to 10 mils, such as from 0 to 5 mils.

As shown, a compression plate 104 may include at least one compression plate mating surface 406, and the first compression plate alignment guide 202 may include at least one alignment guide mating surface 408 configured to precisely mate with the at least one compression plate mating surface 406. For example, a compression plate mating surface 406 and an alignment guide mating surface 408 may mate with one another with a tolerance of from 0 to 25 mils, such as from 0 to 15 mils, such as from 0 to 10 mils, such as from 0 to 5 mils. The compression plate mating surface 406 and the alignment guide mating surface 408 may include one or more annular mating surfaces and/or one or more lateral mating surfaces. For example, the compression plate 104 may include an inward-facing annular mating surface 410 that precisely mates with an outward-facing annular mating surface 412 on the first compression plate alignment guide 202. Additionally, or in the alternative, the compression plate 104 may include an outward-facing annular mating surface 414 that precisely mates with an inward-facing annular mating surface 416 on the first compression plate alignment guide 202. Additionally, the compression plate 104 may include a first lateral mating surface 418 that precisely mates with a second lateral mating surface 420 on the first compression plate alignment guide 202. The compression plate 104 may additionally include a third lateral mating surface 422 that precisely mates with a fourth lateral mating surface 424 on the compression plate alignment guide. 202. The mating surfaces help to align the compression plate 104 and the first compression plate alignment guide 202 within required tolerances for cylindricity, concentricity, perpendicularity, parallelism, and/or angularity, and the like. Using a compression plate 104 as a reference point, such alignment helps to similarly align the lamination stacks 106 of the magnetic-core assembly 100 within required tolerances for cylindricity, concentricity, perpendicularity, parallelism, and/or angularity, and the like.

When fitting a compression plate 104 to a first compression plate alignment guide 202, one or more mating surfaces may be measured, and one or more shims may be used to compensate for a deviation from one or more tolerances. For example, a first axial distance 426 between the first lateral mating surface 418 and the third lateral mating surface 422 may be compared to a second axial distance 428 between the second lateral mating surface 420 and the fourth lateral mating surface 424. One or more shims 430 may be utilized in the event of a deviation between the first axial distance 426 and the second axial distance 428, for example, to bring the deviation within an applicable tolerance.

Figures 4C, 4D, 4E, 4F, 4G, 4H:
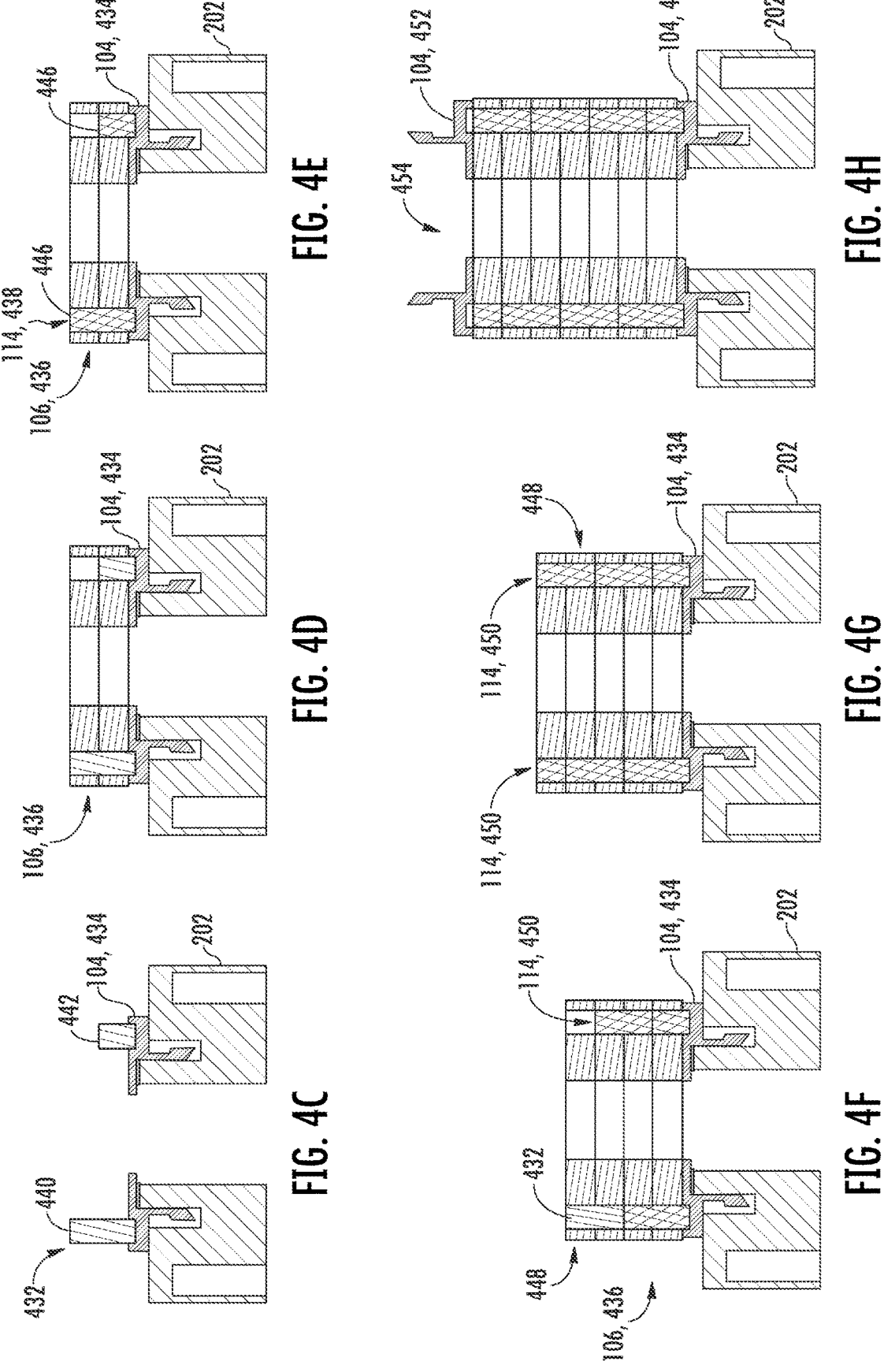

Referring to FIG. 4A, with the compression plate 104 fitted to a first compression plate alignment guide 202, the method 254 of staging the magnetic-core assembly may continue with stacking and at least partially aligning a plurality of lamination stacks 106 on the first compression plate alignment guide 202 (block 402). As shown in FIGS. 4C-4H, a plurality of guideposts 432 may be used to help at least partially align the plurality of lamination stacks 106 during stacking. The guideposts 432 may be configured to fit within magnet retention grooves 124 (FIGS. 1D and 1E) in the compression plate 104. Magnet retention slots 112 (FIG. 1C) in the lamination stacks 106 are configured to fit around the guideposts 432. The guideposts 432 are removed and replaced with permanent magnets 108 and/or a permanent magnet segments 114 when stacking the plurality of lamination stacks 106. The plurality of lamination stacks 106 can be stacked and aligned using the guideposts 432, and the guideposts 432 can be removed and replaced with permanent magnets 108 and/or a permanent magnet segments 114 in any desired sequence. In some embodiments, a plurality of lamination stacks 106 and a first plurality of permanent magnets 438 can be stacked sequentially in layers using the guideposts 432. An exemplary sequence is shown in FIGS. 4C-4H. The exemplary sequence begins with placing a plurality of guideposts 432 in in a plurality of magnet retention grooves 124 in a first compression plate 434 (FIG. 4C), and stacking a first plurality of lamination stacks 436 on the first compression plate 434, with the magnet retention slots 112 in the first plurality of lamination stacks 436 fitting around the guideposts 432 (FIG. 4D). The exemplary sequence continues with removing the guideposts 432 and inserting a first plurality of permanent magnets 438 in the magnet retention slots 112 (FIG. 4E). The sequence may be continued until a desired stack height is reached.

In some embodiments, a combination of long guideposts 440 and short guideposts 442 may be used so as to provide interlocking guideposts 432 and lamination stacks 106. The long guideposts 440 may have a length selected so as to exceed the height of a lamination stack 106, so that the long guidepost 440 may provide a guide for adding one or more subsequent lamination stacks 106 and aligning adjacent lamination stacks 106 with one another. The short guideposts 442 may have a length selected to correspond to the height of a lamination stack 106. Additionally, or in the alternative, a combination of long permanent magnets 444 and short permanent magnets 446 may be used, so as to provide interlocking permanent magnets 438 and guideposts 432. The long permanent magnets 444 may have a length selected so as to exceed the height of a lamination stack 106, so that the long permanent magnets 444 may interlock with adjacent lamination stacks 106. The short permanent magnets 446 may have a length selected to correspond to the height of a lamination stack 106.

Additional lamination stacks may be added by placing a plurality of guideposts 432 in a plurality of magnet retention slots 112 in the first plurality of lamination stacks 436 already stacked on the first compression plate 434 and adding one or more additional lamination stacks 448 to the stack, with the magnet retention slots 112 in the one or more additional lamination stacks 448 fitting around the guideposts 432 (FIG. 4F). The guideposts 432 may again be removed and a second plurality of permanent magnets 450 inserted in the plurality of magnet retention slots 112 in the one or more additional lamination stacks 448 (FIGS. 4F and 4G). This sequence may be continued (FIGS. 4G and 4H) until a desired stack height is obtained (FIG. 4H). A second compression plate 452 is placed in position on the end of the stack opposite to the first compression plate 434, providing a staged magnetic-core assembly 454 (FIG. 4H).

Now turning to FIG. 5A, an exemplary method 256 of assembling a magnetic-core assembling tool 200 will be described. As shown with reference to FIGS. 5B through 5D, a magnetic-core assembling tool 200 may be assembled around a staged magnetic-core assembly 454 (block 256 of FIG. 2B). Additionally, or in the alternative, as shown with reference to FIGS. 5E-5J, a magnetic-core assembling tool 200 may be assembled while concurrently staging the magnetic core assembly 454 (block 256 of FIG. 2B). An exemplary method of 256 of assembling a magnetic-core assembling tool 200 may include attaching a plurality of semiannular tension bars 204 to the first compression plate alignment guide 202 with a first end of each semiannular tension bar attached to the first compression plate alignment guide 202 (block 500). An exemplary method 256 may include fitting a second compression plate alignment guide 206 to a second compression plate 452 and/or within a spaced surrounded by the plurality of semiannular tension bars 204 (block 502). An exemplary method 256 may include attaching a clamping plate 208 to the plurality of semiannular tension bars 204 with a second end of each semiannular tension bar 204 attached to the clamping plate 208 (block 504).

Figures 5B, 5C, 5D:
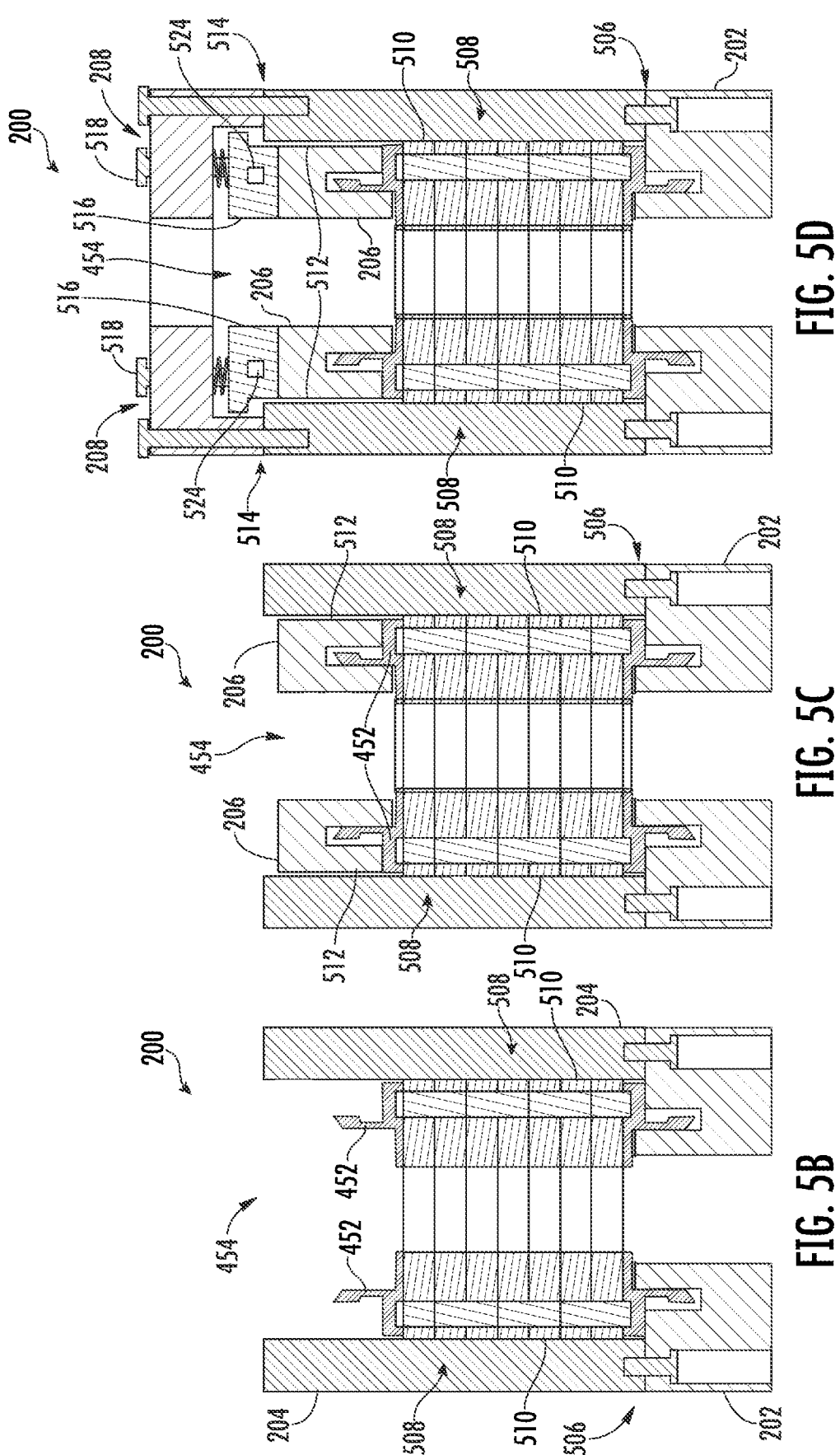
FIGS. 5B-5D schematically depict respective steps of a sequence for assembling a magnetic-core assembling tool around a magnetic-core assembly.

FIGS. 5B-5D show an exemplary embodiment of a magnetic-core assembling tool 200. As shown in FIGS. 5B-5D, a magnetic-core assembling tool 200 may include a first compression plate alignment guide 202, a plurality of semiannular tension bars 204, a second compression plate alignment guide 206, and a clamping plate 208. The magnetic-core assembling tool 200 shown in FIGS. 5B-5D may be utilized to assemble a magnetic core assembly 100 that has been staged as described with reference to FIGS. 4A-4H. The plurality of semiannular tension bars 204 each may be attached to the first compression plate alignment guide 202 at one or more attachment points 506 with a plurality of bolts or the like. Each semiannular tension bar 204 may surround a semiannular portion of the magnetic-core assembly 454. Attachment points 506 where the semiannular tension bars 204 attach to the first compression plate alignment guide 202 are precisely located. When attached to the first compression plate alignment guide 202, the plurality of semiannular tension bars 204 may together define an annulus 508 with an internal annular surface that surrounds the lamination stacks 106 of the magnetic-core assembly 454. A magnetic-core assembling tool 200 may include any number of semiannular tension bars 204.

The semiannular tension bars 204 may include one or more lamination stack aligning surfaces 510. The lamination stack aligning surfaces 510 may be defined at least in part by an internal annular surface of an annulus 508 defined by the semiannular tension bars 204. The lamination stack aligning surfaces 510 may be configured to precisely abut one or more outward facing surfaces 116 of the lamination stacks 106, thereby further aligning the lamination stacks 106 with one another and/or with the compression plates 104, in each case within required tolerances for cylindricity, concentricity, perpendicularity, parallelism, and/or angularity, and the like. For example, the lamination stack aligning surfaces 510 may abut the one or more outward facing surfaces 116 of the lamination stacks 106 with a tolerance of from 0 to 25 mils, such as from 0 to 15 mils, such as from 0 to 10 mils, such as from 0 to 5 mils.

Referring to FIGS. 4B and 5C, the second compression plate alignment guide 206 includes at least one alignment guide mating surface 408 configured to precisely mate with at least one compression plate mating surface 406 of the second compression plate 452 at one or more annular mating surfaces and/or one or more lateral mating surfaces. The second compression plate alignment guide 206 may be inserted axially into the internal annular space of the annulus 508 defined by the plurality of semiannular tension bars 204 and mated with the second compression plate 452, for example, after the semiannular tension bars 204 have been attached to the first compression plate alignment guide 202. Alternatively, the second compression plate alignment guide 206 may be mated with the second compression plate 452 prior to attaching the semiannular tension bars 204 to the first compression plate alignment guide 202. The one or more lamination stack aligning surfaces 510 may be configured to precisely abut one or more outward facing surfaces 512 of the second compression plate alignment guide 206, thereby helping to align the second compression plate 452 and/or the lamination stacks 106 within required tolerances for cylindricity, concentricity, perpendicularity, parallelism, and/or angularity, and the like. For example, the lamination stack aligning surfaces 510 may abut the one or more outward facing surfaces 512 of the second compression plate alignment guide 206 with a tolerance of from 0 to 25 mils, such as from 0 to 15 mils, such as from 0 to 10 mils, such as from 0 to 5 mils. In some embodiments, the combination of the first compression plate alignment guide 202, the plurality of semiannular tension bars 204, and the second compression plate alignment guide 206 provides a system for aligning the lamination stacks 106 with one another and/or with the compression plates 104 with improved precision and tighter tolerances.

Referring to FIG. 5D, the clamping plate 208 may be attached to the semiannular tension bars 204 after the semiannular tension bars 204 have been attached to the first compression plate alignment guide 202 and the second compression plate alignment guide 206 has been inserted axially into the internal annular space of the annulus 508 defined by the plurality of semiannular tension bars 204 and mated with the second compression plate 452. The clamping plate 208 may be attached to the semiannular tension bars 204 at one or more attachment points 514 with a plurality of bolts or the like. The clamping plate 208 includes a plurality of compression shoes 516, each configured to apply a variable amount of compression to the magnetic-core assembly 454 by adjusting a compression bolt 518 corresponding a respective compression shoe 516.

Any number of compression shoes 516 may be provided. For example, the number of compression shoes 516 in a magnetic-core assembling tool 200 may range from 6 to 48 shoes, from 6 to 12 shoes, from 8 to 24 shoes, from 18 to 36 shoes, from 24 to 48 shoes, or from 36 to 48 shoes. As the compression shoes are tightened, compressive force is applied to the magnetic-core assembly 454 housed in the magnetic-core assembling tool 200. The compressive force may be adjusted separately for each compression shoe 516. Such separate adjustment may be utilized to apply a more uniform compression to the lamination stacks 106.

FIGS. 5E-5J show another exemplary embodiment of a magnetic-core assembling tool 200. The magnetic-core assembling tool 200 shown in FIGS. 5E-5J may be utilized to assemble a magnetic core assembly 100 that has been staged as described with reference to FIGS. 4A-4H. Additionally, or in the alternative, the magnetic-core assembling tool 200 shown in FIGS. 5E-5J may be utilized to assemble a magnetic core assembly 100 while concurrently staging the magnetic core assembly 100, such as while concurrently staging the magnetic core assembly 100 within the magnetic-core assembling tool 200. As shown in FIGS. 5E-5J, a magnetic-core assembling tool 200 may include a first compression plate alignment guide 202, a plurality of semiannular tension bars 204, a plurality of semiannular compression bars 205, a second compression plate alignment guide 206, and a clamping plate 208. The plurality of semiannular tension bars 204 each may be attached to the first compression plate alignment guide 202 at one or more attachment points 506 with a plurality of bolts or the like. When attached to the first compression plate alignment guide 202, the plurality of semiannular tension bars 204 may together define an annulus 508.

Figures 5E, 5F, 5G:
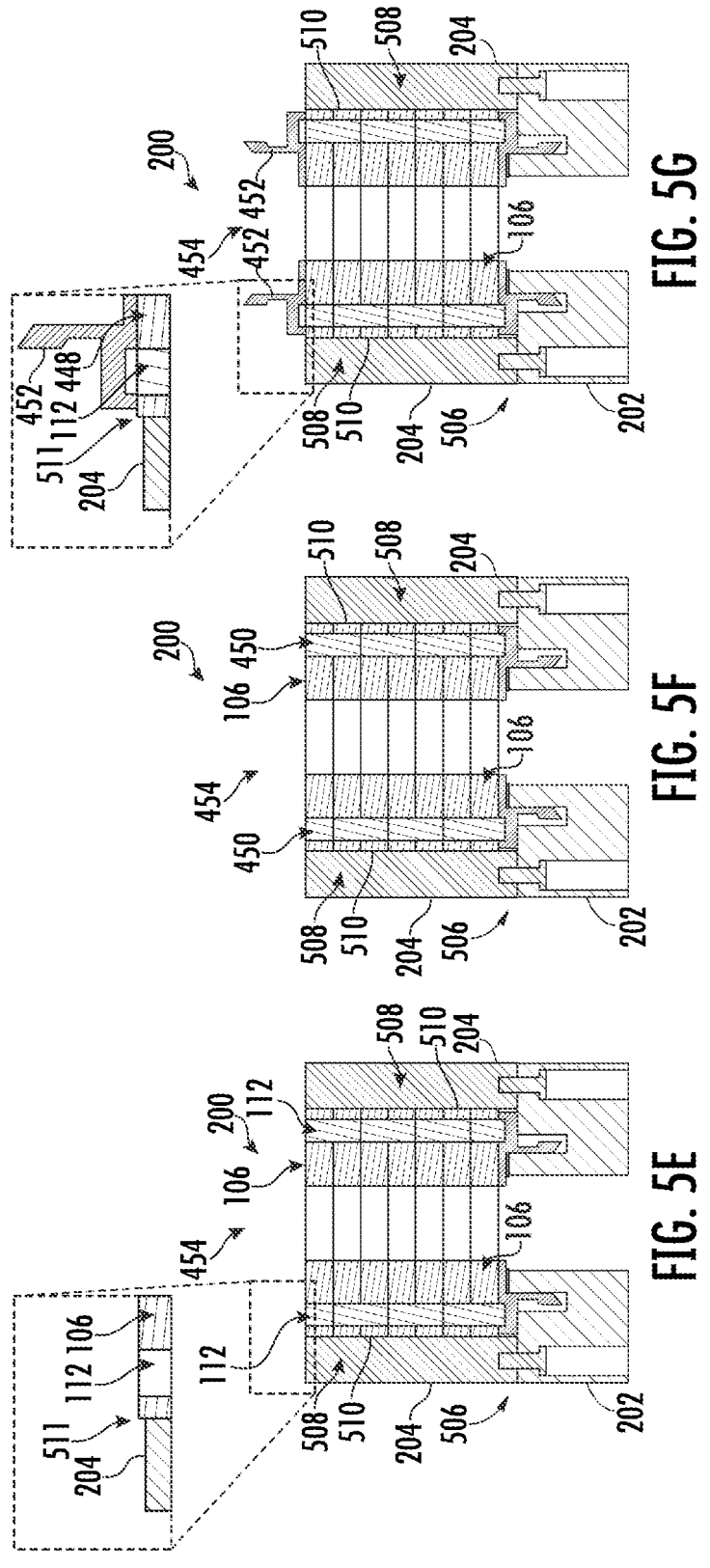
FIGS. 5E-5J schematically depict respective steps of a sequence for assembling a magnetic-core assembling tool around a magnetic-core assembly.

As shown in FIG. 5E, a plurality of lamination stacks 106 may be inserted within an internal annular space of the annulus 508 defined by the plurality of semiannular tension bars. The semiannular tension bars 204 may respectively surround a semiannular portion of the lamination stacks 106. The semiannular tension bars 204 may include one or more lamination stack aligning surfaces 510. The lamination stack aligning surfaces 510 may be defined at least in part by an internal annular surface of an annulus 508 defined by the semiannular tension bars 204. The lamination stack aligning surfaces 510 may be configured to precisely abut one or more outward facing surfaces 116 of the lamination stacks 106, thereby further aligning the lamination stacks 106 with one another and/or with the compression plates 104, in each case within required tolerances for cylindricity, concentricity, perpendicularity, parallelism, and/or angularity, and the like. For example, the lamination stack aligning surfaces 510 may abut the one or more outward facing surfaces 116 of the lamination stacks 106 with a tolerance of from 0 to 25 mils, such as from 0 to 15 mils, such as from 0 to 10 mils, such as from 0 to 5 mils. A magnetic-core assembling tool 200 may include any number of semiannular tension bars 204.

As shown in FIG. 5F, a plurality of permanent magnets 450 may be inserted into the magnet retention slots 112. The permanent magnets 450 may be inserted into the magnet retention slots 112 after the lamination stacks 106 have been positioned within the annular space of the annulus 508 defined by the plurality of semiannular tension bars 204. Additionally, or in the alternative, the permanent magnets 450 and the lamination stacks 106 may be inserted sequentially within the annular space of the annulus 508 defined by the plurality of semiannular tension bars 204 as described with reference to FIGS. 4C-4H. However, in some embodiments, the lamination stacks 106 may be inserted sequentially within the annular space of the annulus 508 defined by the plurality of semiannular tension bars 204 without the use of guideposts 432. For example, the guideposts 432 may be unnecessary at least in part because of the degree of tolerance with which the lamination stacks 106 may be aligned by the lamination stack aligning surfaces 510 of the plurality of semiannular tension bars 204. As shown in FIG. 5G, a second compression plate 452 may be added to the plurality of lamination stacks 106.

As shown in FIG. 5E-5G, the plurality of semiannular tension bars 204 may be configured with a height such that each of the plurality of lamination stacks 106 may have a protruding portion 511 that extend outward beyond the annular space of the annulus 508 defined by the plurality of semiannular tension bars 204. The plurality of lamination stacks 106 may be compressed by the plurality of semiannular compression bars 205 by least a portion of the distance that the protruding portion 511 extends beyond the annular space of the annulus 508.

Referring now to FIGS. 5A and 5H-5J, the plurality of semiannular compression bars 205 may be respective attached to one or more of the plurality of semiannular tension bars 204 at one or more attachment points 507 with a plurality of bolts or the like. As shown in FIG. 5A, in some embodiments, an exemplary method 256 of assembling a magnetic-core assembling tool 200 may include fitting a plurality of lamination stacks 106 within a space surrounded by the plurality of semiannular tension bars, such as prior to staging the plurality of lamination stacks 106 (block 501). For example, the magnetic core assembly 100 may be staged within a partially assembled magnetic-core assembling tool 200.

An exemplary method 256 may include attaching a plurality of semiannular compression bars 205 to the plurality of semiannular tension bars 204 (block 503). A first end of the respective ones of the plurality of semiannular compression bars 205 may be attached to a second end of one or more of the plurality of semiannular tension bars 204. An exemplary method 256 may include fitting a second compression plate alignment guide to a second compression plate 452 and/or within a spaced surrounded by the plurality of semiannular compression bars 205 (block 505). An exemplary method 256 may include attaching a clamping plate 208 to the plurality of semiannular compression bars 205 with a second end of each semiannular compression bar 205 attached to the clamping plate 208 (block 517).

Figures 5H, 5I, 5J:
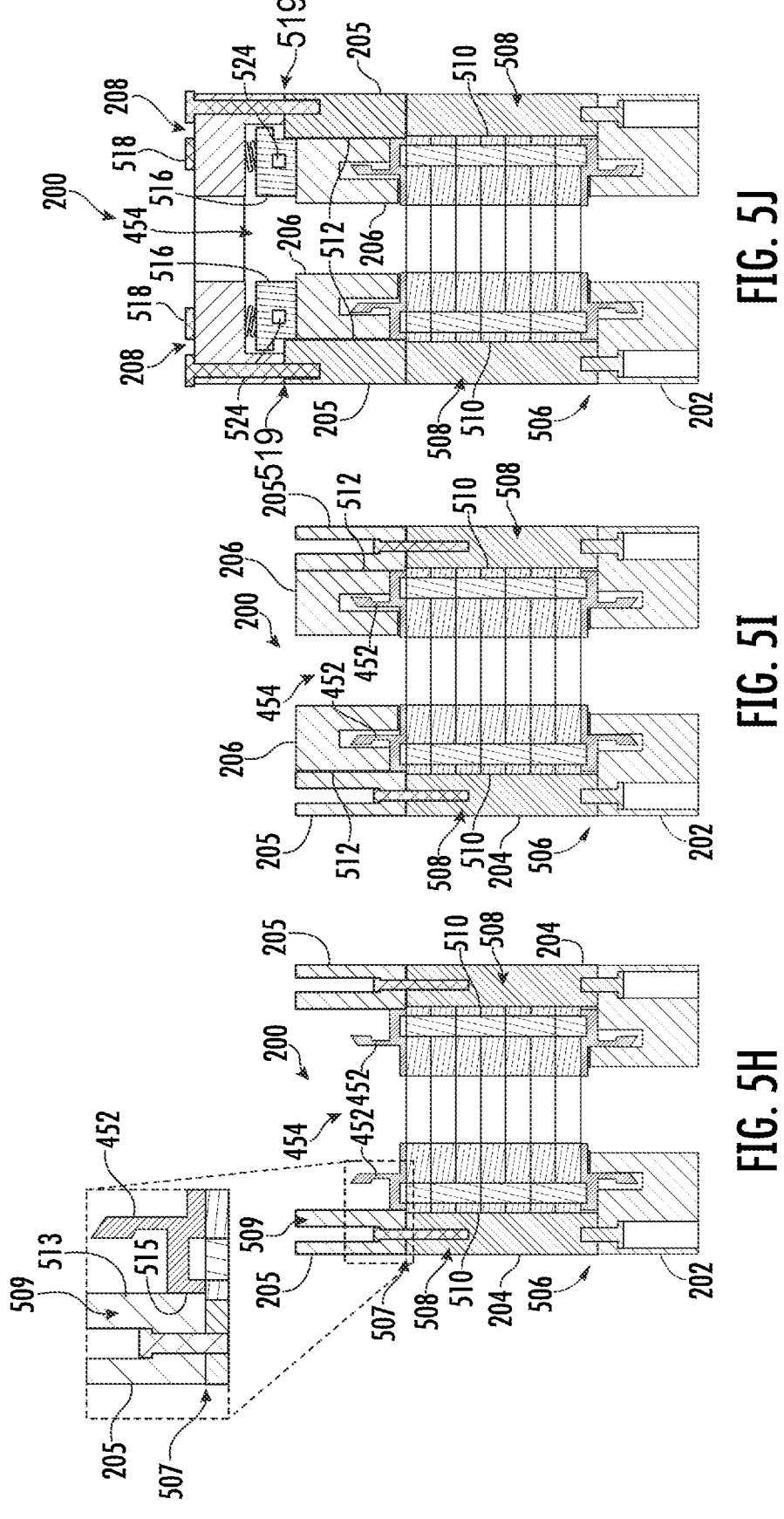

As shown in FIG. 5H, by attaching the respective semiannular compression bars 205 to the plurality of semiannular tension bars 204, a plurality of lamination stacks 106 surrounded by the plurality of semiannular tension bars 204 by the plurality of semiannular compression bars 205. For example, the plurality of lamination stacks 106 may be at least partially compressed such that at least part of the protruding portion 511 of the plurality of lamination stacks 106 may be moved within the annular space of the annulus 508 defined by the plurality of semiannular tension bars 204. In some embodiments, the protruding portion 511 of the plurality of lamination stacks 106 may be aligned with an end portion of the plurality of semiannular tension bars 204, such as an end portion of the plurality of semiannular tension bars that faces the plurality of semiannular compression bars 205. Attachment points 507 where the semiannular compression bars 205 attach to the semiannular tension bars 204 are precisely located. When attached to the plurality of semiannular tension bars 204, the plurality of semiannular compression bars 205 may together define an annulus 509 with an internal annular surface that surrounds the second compression plate 452. A magnetic-core assembling tool 200 may include any number of semiannular compression bars 205.

The semiannular compression bars 205 may include one or more compression plate aligning surfaces 513. The compression plate aligning surfaces 513 may be defined at least in part by an internal annular surface of an annulus 509 defined by the semiannular compression bars 205. The compression plate aligning surfaces 513 may be configured to precisely abut one or more outward facing surfaces 515 of the second compression plate 452, thereby contributing to alignment of the second compression plate 452 with the magnetic-core assembly 454, for example, within required tolerances for cylindricity, concentricity, perpendicularity, parallelism, and/or angularity, and the like. For example, the compression plate aligning surfaces 513 may abut the one or more outward facing surfaces 515 of the second compression plate 452 with a tolerance of from 0 to 25 mils, such as from 0 to 15 mils, such as from 0 to 10 mils, such as from 0 to 5 mils.

Referring to FIGS. 4B and 5I, the second compression plate alignment guide 206 includes at least one alignment guide mating surface 408 configured to precisely mate with at least one compression plate mating surface 406 of the second compression plate 452 at one or more annular mating surfaces and/or one or more lateral mating surfaces. The second compression plate alignment guide 206 may be inserted axially into the internal annular space of the annulus 509 defined by the plurality of semiannular compression bars 205 and mated with the second compression plate 452, for example, after the plurality of semiannular compression bars 205 have been attached to the plurality of semiannular tension bars 204. Alternatively, the second compression plate alignment guide 206 may be mated with the second compression plate 452 prior to inserting the second compression plate 452 into the axially into the internal annular space of the annulus 509 defined by the plurality of semiannular compression bars 205 and mated with the second compression plate 452. The one or more compression plate aligning surfaces 513 may be configured to precisely abut one or more outward facing surfaces 512 of the second compression plate alignment guide 206, thereby helping to align the second compression plate 452 and/or the lamination stacks 106 within required tolerances for cylindricity, concentricity, perpendicularity, parallelism, and/or angularity, and the like. For example, the compression plate aligning surfaces 513 may abut the one or more outward facing surfaces 512 of the second compression plate alignment guide 206 with a tolerance of from 0 to 25 mils, such as from 0 to 15 mils, such as from 0 to 10 mils, such as from 0 to 5 mils. In some embodiments, the combination of the first compression plate alignment guide 202, the plurality of semiannular tension bars 204, the plurality of semiannular compression bars 205, and the second compression plate alignment guide 206 provides a system for aligning the lamination stacks 106 with one another and/or with the compression plates 104 with improved precision and tighter tolerances.

Referring to FIG. 5J, the clamping plate 208 may be attached to the plurality of semiannular compression bars 205 after the plurality of semiannular compression bars 205 have been attached to the plurality of semiannular tension bars 204 and the second compression plate alignment guide

206 has been inserted axially into the internal annular space of the annulus 509 defined by the plurality of semiannular compression bars 205 and mated with the second compression plate 452. The clamping plate 208 may be attached to the semiannular compression bars 205 at one or more attachment points 519 with a plurality of bolts or the like. The clamping plate 208 includes a plurality of compression shoes 516, each configured to apply a variable amount of compression to the magnetic-core assembly 454 by adjusting a compression bolt 518 corresponding a respective compression shoe 516.

Any number of compression shoes 516 may be provided. For example, the number of compression shoes 516 in a magnetic-core assembling tool 200 may range from 6 to 48 shoes, from 6 to 12 shoes, from 8 to 24 shoes, from 18 to 36 shoes, from 24 to 48 shoes, or from 36 to 48 shoes. As the compression shoes are tightened, compressive force is applied to the magnetic-core assembly 454 housed in the magnetic-core assembling tool 200. The compressive force may be adjusted separately for each compression shoe 516. Such separate adjustment may be utilized to apply a more uniform compression to the lamination stacks 106.

Figure 5K:
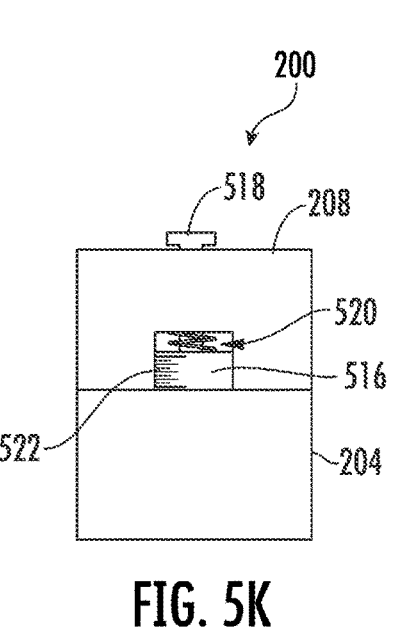
FIGS. 5K-5N schematically depict respective steps of compressing a magnetic-core assembly with a magnetic-core assembling tool.

Referring now to FIG. 5K, in some embodiments, the clamping plate 208 may include a witness slot 520 to observe the position of a compression shoe 516, and a compression shoe may include position markings 522 observable through the witness slot 520 to indicate the location of the compression shoe 516. Some or all of the compression shoes 516 may include a witness slot 520. The witness slots 520 may be used to confirm that each compression shoe 516 has compressed the lamination stacks 106 in the magnetic-core assembly 454 an axial distance within a required tolerance. Additionally, in some embodiments a compression shoe 516 may include a pressure sensor 524 such as a load cell to confirm that each compression shoe 516 has applied an axial compression pressure within a require tolerance. For example, a typical axial compression pressure tolerance may be from 0.5 to 2.5 megapascal, such as from 0.5 to 1.0 megapascal, such as from 1.0 to 1.5 megapascal, such as from 1.5 to 2.0 megapascal, or such as from 2.0 to 2.5 megapascal.

Figure 5L:
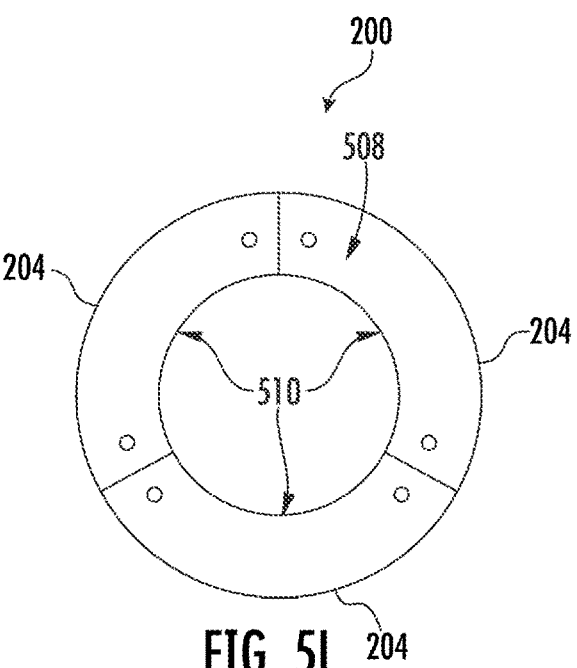
Figure 5M:
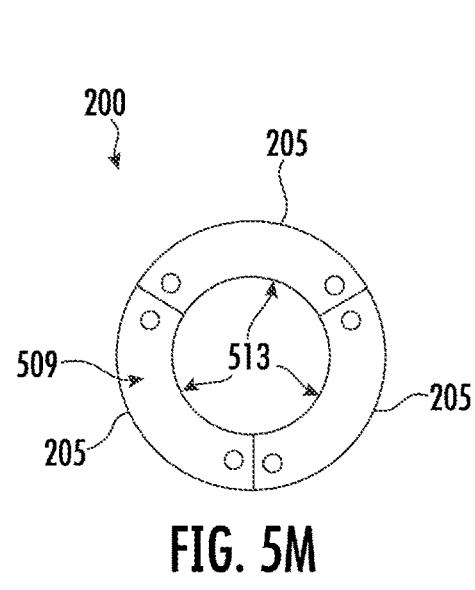
Figure 5N:
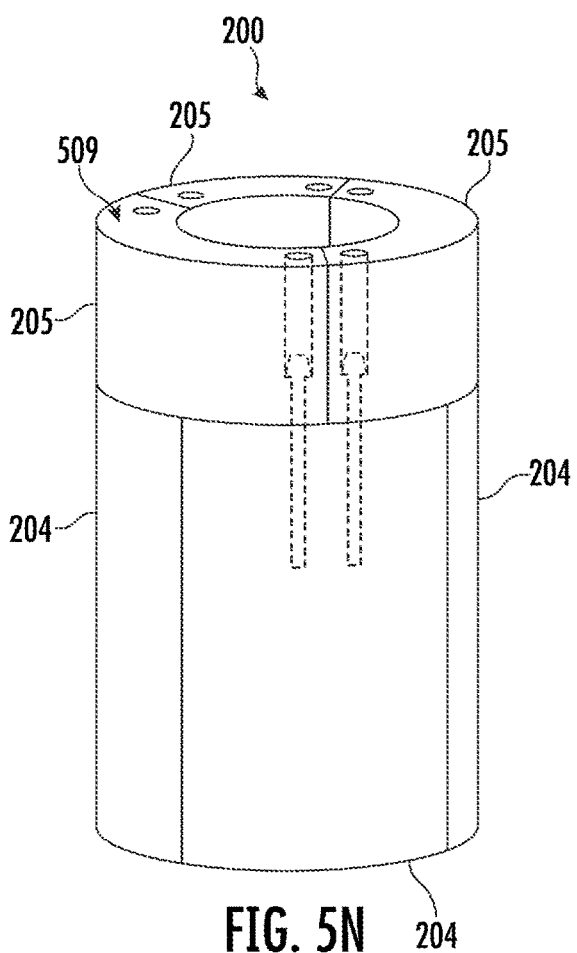

As shown in FIG. 5L, a magnetic-core assembling tool 200 may include three semiannular tension bars 204. Alternatively, a magnetic-core assembling tool 200 may include two semiannular tension bars 204, or more than three semiannular tension bars 204, such as from 3 to 8 semiannular tension bars 204. In various embodiments, annular gaps may exist between the respective semiannular tension bars 204. As shown in FIG. 5M, a magnetic-core assembling tool 200 may include three semiannular compression bars 205. Alternatively, a magnetic-core assembling tool 200 may include two semiannular compression bars 205, or more than three semiannular compression bars 205, such as from 3 to 8 semiannular tension bars 204. In various embodiments, annular gaps may exist between the respective semiannular compression bars 205. As shown in FIG. 5N, a plurality of semiannular tension bars 204 and a plurality of semiannular compression bars 205 may be configured to overlap one another. For example, a semiannular tension bar 204 may overlap two semiannular compression bars 205, and a semiannular compression bar 205 may overlap two semiannular tension bars 204.

It is preferable that the magnetic-core assembly 454 remain under constant axial compression compressed once the magnetic-core assembling tool 200 has been assembled and the magnetic-core assembly 454 axially compressed. Accordingly, the magnetic-core assembling tool 200 is configured such that subsequent assembly steps, such as those discussed below with respect to FIGS. 6A-6G, may be performed with the magnetic-core assembly 454 housed within the magnetic-core assembling tool 200. For example, referring to FIG. 2B, an exemplary method 250 of assembling a magnetic-core assembly 100 may further include injecting magnet retention adhesive into a plurality of magnet retention slots 112 in a magnetic-core assembly 454 housed in the magnetic-core assembling tool 200 (block 258). Additionally, the exemplary method 250 also optionally includes performing a machining operation on a magnetic-core assembly 454 housed in the magnetic-core assembling tool 200 (block 260), and/or coupling a rotor shaft 110 to a magnetic-core assembly 454 housed in the magnetic-core assembling tool 200 (block 262).

Figure 6A:
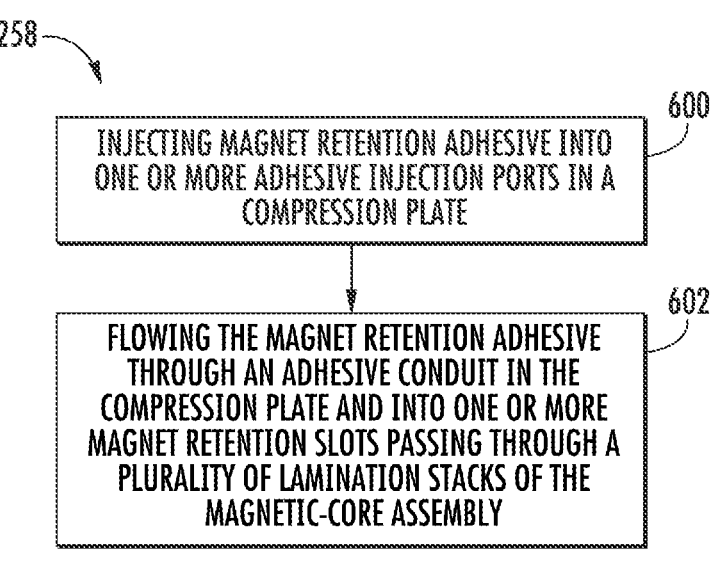
FIG. 6A shows a flowchart depicting an exemplary sequence of steps for injecting magnet retention adhesive into a magnetic-core assembly housed in a magnetic-core assembling tool.

Referring now to FIGS. 6A-6G, exemplary methods of injecting magnet retention adhesive into a plurality of magnet retention slots 112 in the magnetic-core assembly 454 (block 258 of FIG. 2B) will be described. As shown in FIG. 6A, an exemplary method 258 of injecting magnet retention adhesive into a magnetic-core assembly 454 (block 258 of FIG. 2B) may include injecting magnet retention adhesive into one or more adhesive injection ports 120 in a compression plate 104 (block 600). An exemplary method 258 may include flowing the magnet retention adhesive through an adhesive conduit 122 in the compression plate 104 and into one or more magnet retention slots 112 passing through a plurality of lamination stacks 106 of the magnetic-core assembly 454 (block 602).

Figure 6B:
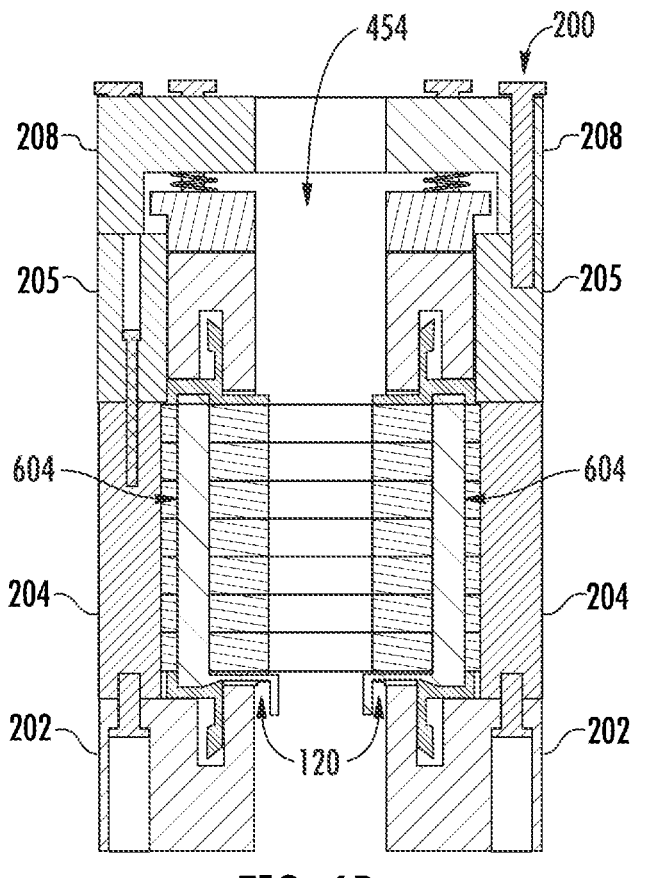
FIG. 6B schematically depicts magnet retention adhesive being injected into a magnetic-core assembly housed in the magnetic-core assembling tool of FIG. 2A.

FIG. 6B shows magnet retention adhesive 604 being injected into a magnetic-core assembly 454. As shown, the magnet retention adhesive 604 flows through one or more injection ports 120 leading to an adhesive conduit 122 in a compression plate 104. The adhesive conduit 122 may include one or more magnet retention grooves 124. The magnet retention adhesive 604 flow into one or more magnet retention slots 112 passing through a plurality of lamination stacks 106 of the magnetic-core assembly 454. The magnet retention adhesive 604 is applied while permanent magnets are present in the magnet retention slots 112. The magnet retention adhesive 604 flows through the space between the permanent magnets and the edges of the magnet retention slots 112 across the axial length of the magnet retention slots 112. In some embodiments, a witness slot (not shown) may be provided to confirm full penetration of the magnet retention adhesive 604. The magnet retention adhesive 604 is applied while the lamination stacks 106 are under axial compression applied by the magnetic-core assembling tool 200. As such, in contrast with adhesives that may be applied across the face of laminations, the magnet retention adhesive 604 remains substantially within the magnet retention slots 112. It will be appreciated that although an insignificant amount of magnet retention adhesive 604 may contact the interface between the edges and faces of the lamination stacks 106, the axial compression applied by the magnetic-core assembling tool 200 would prevent magnet retention adhesive 604 from flowing across the face of the laminations (e.g., across the face of the lamination stacks 106, the lamination sub-stacks 304, and/or the individual laminations 314). The magnet retention adhesive 604 may include any suitable adhesive or combination of adhesives.

Referring to FIG. 2B, in some embodiments, injecting the magnet retention adhesive (block 258) concludes the exemplary method 250 of assembling a magnetic-core assembly 100, in which case the assembled magnetic-core assembly 100 may be removed from the magnetic-core assembling tool 200 after the magnet retention adhesive 604 has sufficiently cured. However, in other embodiments the exemplary method 250 may additionally include performing a machining operation on the magnetic-core assembly 454 housed in the magnetic-core assembling tool 200 (block 260), and/or coupling a rotor shaft 110 to a magnetic-core assembly 454 housed in the magnetic-core assembling tool 200 (block 262). The machining operation (block 260) and/or the coupling of the rotor shaft 110 (block 262) to the magnetic-core assembly 454 are performed while the magnetic-core assembly 454 remains housed in the magnetic-core assembling tool 200. The magnetic-core assembling tool 200 helps to maintain proper compression and alignment of the magnetic-core assembly 454 and reduces the possibility of warping, shifting of laminations 314, or damage when performing these steps. Preferably, the magnetic-core assembly 454 is maintained under constant axial compression in the magnetic-core assembling tool 200 until each step in the assembly process has been completed and the magnetic-core assembly 100 is at ambient temperature.

Figures 6C, 6D:
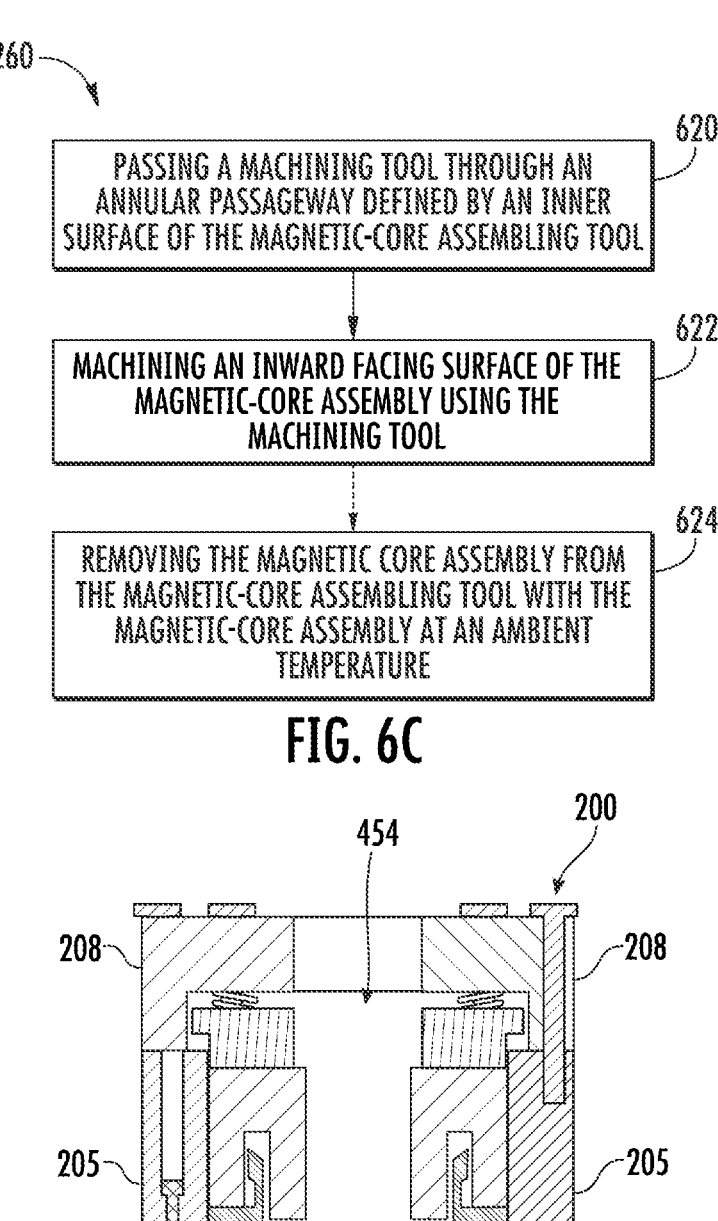
FIG. 6C shows a flowchart depicting an exemplary sequence of steps for performing a machining operation on a magnetic-core assembly housed in a magnetic-core assembling tool.
FIG. 6D schematically depicts a machining operation performed on a magnetic-core assembly housed in a magnetic-core assembling tool.

As shown in FIG. 6C, an exemplary method 260 of performing a machining operation on a magnetic-core assembly 454 (block 260 of FIG. 2B) includes passing a machining tool through an annular passageway defined by an inner surface of the magnetic-core assembling tool 200 (block 620), machining an inward facing surface of the magnetic-core assembly 454 using the machining tool (block 622), and optionally removing the magnetic-core assembly 100 from the magnetic-core assembling tool 200 with the magnetic-core assembly 100 at an ambient temperature (block 624). FIG. 6D schematically depicts a machining tool performing a machining operation (arrow 260) on an inward facing surface 118 of a magnetic-core assembly 454 housed in a magnetic-core assembling tool 200. The machining operation (block 260) provides an annular inner surface 626, which for example may define an annular rotor shaft receiving space 628 for receiving a rotor shaft 110. The machining operation may include boring, turning, drilling, reaming, milling, cutting, combinations thereof, or the like. The machining operation may smoothen and or apply a texture to the annular inner surface 626 and/or may conform the diameter of the annular rotor shaft receiving space 628 to accommodate a rotor shaft 110 that has a particular outer diameter.

As shown in FIG. 6E, the machining tool removes a portion of the inner surface 630 of the lamination stacks 106. In some embodiments, the portion of the inner surface 630 removed by the machining tool includes the tacking adhesive 316 placed at one or more locations of the one or more inward facing surfaces 118 of the laminations 314, as discussed with respect to FIG. 3C. As such, the machining tool may remove the tacking adhesive 316 used to temporarily hold the laminations 314 in position when assembling the lamination stacks 106 and the lamination sub-stacks 304. With the tacking adhesive 316 removed by the machining operation, the magnet retention adhesive 604 may be the only adhesive in the assembled magnetic-core assembly 100.

Referring to FIG. 2B, in some embodiments, performing a machining operation on the magnetic-core assembly 454 (block 260) concludes the exemplary method 250 of assembling a magnetic-core assembly 100, in which case the assembled magnetic-core assembly 100 may be removed from the magnetic-core assembling tool 200 after the machining operation (block 260) has been completed. When removing the magnetic-core assembly 100 after performing the machining operation (block 260), it is preferable to remove the magnetic-core assembling tool 200 when the magnetic-core assembly 100 is at ambient temperature to reduce the possibility of warping or shifting of laminations 314 due to changes in temperature. For example, the machining operation (block 260) may generate heat in various regions of the magnetic-core assembly 100, which may or may not be uniformly distributed. Even a partial release of compression on the magnetic-core assembly 100 before such heat dissipates or when the magnetic-core assembly 100 is not at ambient temperature may cause warping or shifting of laminations 314. Accordingly, the magnetic-core assembly 454 preferably remains under constant axial compression until each step in the exemplary method 250 have been completed and the magnetic-core assembly 100 is at ambient temperature and ready to be removed from the magnetic-core assembling tool 200.

The exemplary method 250 of assembling a magnetic-core assembly 100 may additionally or alternatively include coupling a rotor shaft 110 to a magnetic-core assembly 454 housed in the magnetic-core assembling tool 200 (block 262). As shown in FIG. 6F, an exemplary method 262 of coupling a rotor shaft 110 to a magnetic-core assembly 454 housed in the magnetic-core assembling tool 200 (block 262 of FIG. 2B) includes heating the magnetic-core assembly 454 and the magnetic-core assembling tool 200 to a pre-scribed thermal expansion temperature (block 632) and/or cooling a rotor shaft 110 to a prescribed thermal contraction temperature (block 634), inserting the rotor shaft 110 through an annular rotor shaft receiving space 628 of the magnetic-core assembly 454 (block 636), and removing the magnetic-core assembly 100 from the magnetic-core assembling tool 200 with the magnetic-core assembly 100 and the rotor shaft 110 at an ambient temperature (block 638).

Figures 6G, 6H:
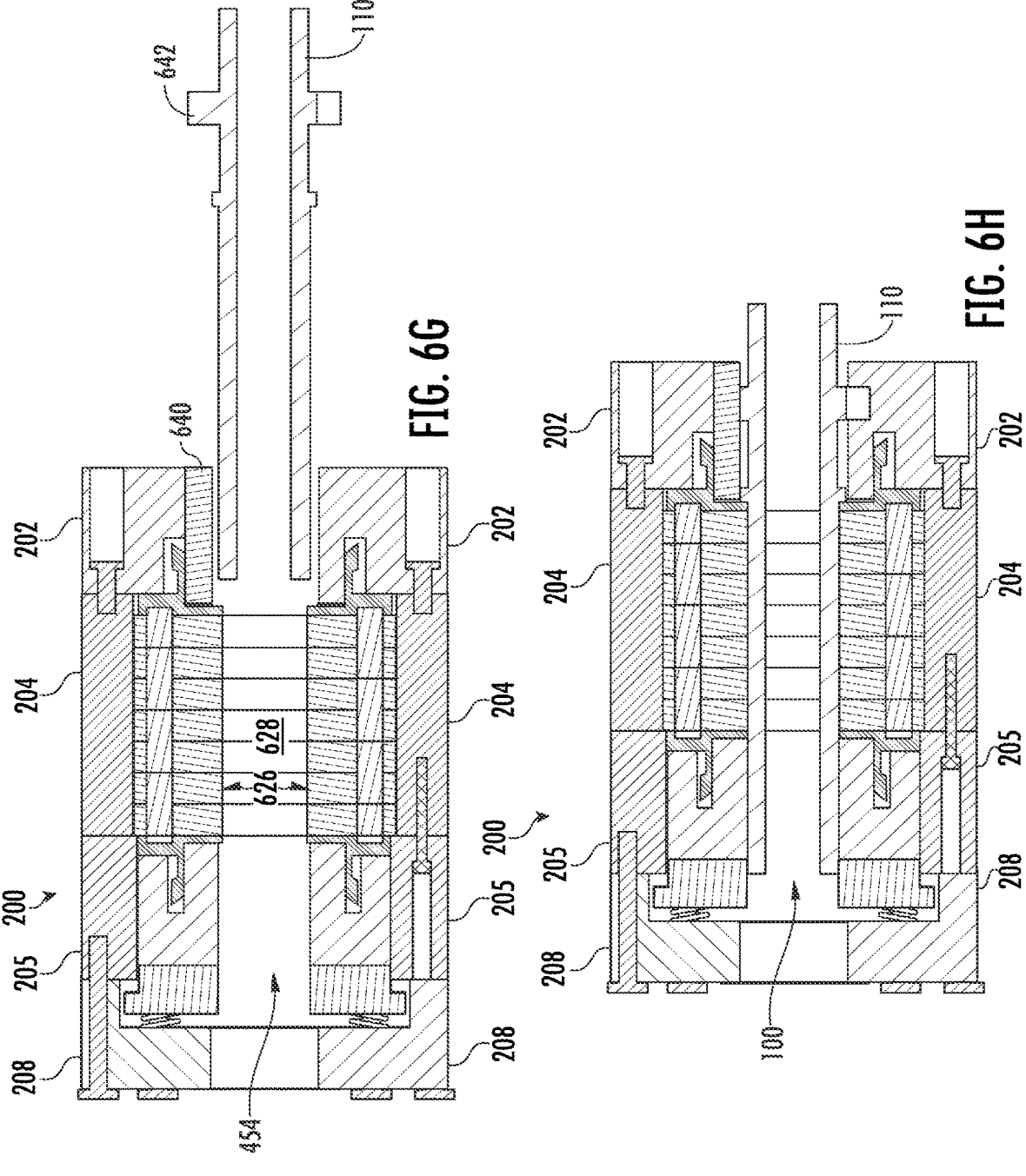
FIGS. 6G and 6H schematically depicts a rotor shaft being coupled to a magnetic-core housed in a magnetic-core assembling tool.

FIG. 6G schematically depicts a magnetic-core assembly 454 and a magnetic-core assembling tool 200 heated to a prescribed thermal expansion temperature, and a rotor shaft 110 cooled to a prescribed thermal contraction temperature. The prescribed thermal expansion temperature, the pre-scribed thermal contraction temperature, or a combination thereof are selected so as to allow the rotor shaft 110 to pass through the annular rotor shaft receiving space 628 without excessive interference from contact between the rotor shaft 110 and the annular inner surface 626 defining the annular rotor shaft receiving space 628. The magnetic-core assembly 454 and the magnetic-core assembling tool 200 may be heated in a furnace or the like until the prescribed thermal expansion temperature is reached. The rotor shaft 110 may be cooled in a freezer or with a cryogenic fluid such as liquid nitrogen until the prescribed thermal cooling temperature is reached. In some embodiments, the magnetic-core assembling tool 200 may include one or more flange-receiving grooves or recesses 640 configured to receive a flange 642 on the driveshaft.

Referring to FIG. 2B, some embodiments, coupling the rotor shaft 110 to the magnetic-core assembly 454 (block 262) concludes the exemplary method 250 of assembling a magnetic-core assembly 100, in which case the assembled magnetic-core assembly 100 may be removed from the magnetic-core assembling tool 200 after the coupling step (block 262) has been completed. Preferably the magnetic-core assembly 100 remains under constant axial compression until the magnetic-core assembly 100 returns to ambient temperature following heating and/or cooling performed for inserting the rotor shaft 110 through the annular rotor shaft receiving space 628. Accordingly, preferably the magnetic-core assembly 100 is allowed to cool to ambient temperature and/or the rotor shaft 110 is allowed to warm to ambient temperature before removing the magnetic-core assembly 100 from the magnetic-core assembling tool 200.

Various components of the magnetic-core assembling tool 200 and/or various components of the stack assembling-tool 306 may be manufactured using any desired technology, including casting, subtractive manufacturing (e.g., machining, drilling, etc.), additive manufacturing, a combination thereof, or any other technique. In an exemplary embodiment, a machining process may be used to form one or more components of the of the magnetic-core assembling tool 200, including the first compression plate alignment guide 202, the plurality of semiannular tension bars 204, second compression plate alignment guide 206, and/or the clamping plate 208.

Figure 7A:
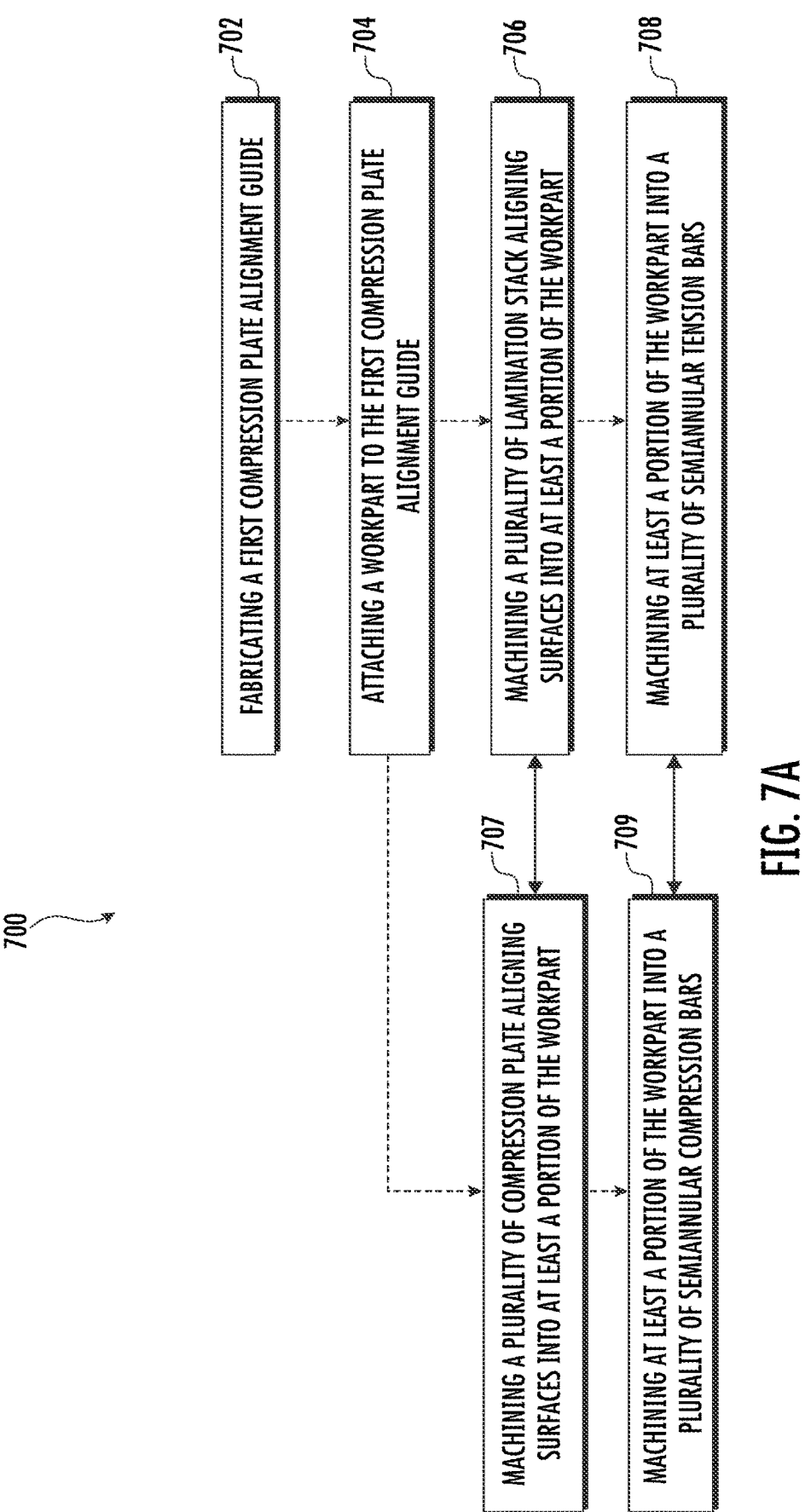
FIG. 7A shows a flowchart depicting an exemplary sequence of steps for fabricating a magnetic-core assembling tool.

As shown in FIG. 7A, an exemplary method 700 of fabricating a magnetic-core assembling tool 200 includes fabricating a first compression plate alignment guide 202 (block 702), attaching a workpart to the first compression plate alignment guide 202 (block 704), machining a plurality of lamination stack aligning surfaces into the workpart (block 706), and machining the workpart into a plurality of semiannular tension bars 204 (block 708). FIG. 7B shows a workpart 710 attached to a first compression plate alignment guide 202. FIG. 7C shows a plurality of lamination stack aligning surfaces 510 having been machined into the work-part 710. FIG. 7D shows a portion of the workpart 710 having been machined into a plurality of semiannular tension bars 204.

An exemplary method 700 of fabricating a magnetic-core assembling tool 200 may additionally or alternatively include machining a plurality of compression plate aligning surfaces into the workpart (block 707), and machining the workpart into a plurality of semiannular compression bars 205 (block 709). FIG. 7E shows a portion of the workpart 710 having been machined into a plurality of semiannular compression bars 205.

In another exemplary embodiment, a magnetic-core assembling tool 200 may be manufactured at least in part using an additive manufacturing process, which may include any process that involves layer-by-layer construction or additive fabrication (as opposed to material removal as with subtractive manufacturing processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

Any desired materials may be used to manufacture the components described herein. Exemplary materials include aluminum alloys, steel alloys, nickel alloys (e.g., superalloys), and composites such as ceramic matrix composite (CMC) materials. Exemplary CMC materials may include silicon carbide, silicon, silica, or alumina matrix materials and combinations thereof. Ceramic fibers may be embedded within the matrix, such as oxidation stable reinforcing fibers including monofilaments like sapphire and silicon carbide, yarn including silicon carbide, alumina silicates, and chopped whiskers and fibers, and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

Further aspects of the invention are provided by the subject matter of the following clauses:

1. A method of assembling a magnetic-core assembly, the method comprising: assembling a plurality of lamination stacks; staging the plurality of lamination stacks to provide a magnetic-core assembly; assembling a magnetic-core assembling-tool around the magnetic-core assembly; and injecting magnet retention adhesive into a plurality of magnet retention slots in the magnetic-core assembly housed in the magnetic-core assembling tool.

2. The method of any preceding clause, wherein assembling a plurality of lamination stacks comprises: assembling a plurality of lamination sub-stacks from a plurality of laminations; and assembling the plurality of lamination stacks from the plurality of lamination sub-stacks.

3. The method of any preceding clause, wherein the plurality of lamination sub-stacks and/or the plurality of lamination stacks are assembled using a stack assembling-tool.

4. The method of any preceding clause, wherein: assembling a plurality of lamination sub-stacks from a plurality of laminations comprises applying a tacking adhesive at one or more locations at an inward facing surface of at least a portion of the plurality of laminations; and/or assembling a plurality of lamination stacks from the plurality of lamination sub-stacks comprises applying a tacking adhesive at one or more locations at an inward facing surface of at least a portion of the plurality of lamination sub-stacks.

5. The method of any preceding clause, wherein staging the plurality of lamination stacks to provide a magnetic-core assembly comprises: fitting a first compression plate to a first compression plate alignment guide; stacking a plurality of lamination stacks on the first compression plate fitted to the first compression plate alignment guide; and stacking a second compression plate on the plurality of lamination stacks.

6. The method of any preceding clause, wherein assembling a magnetic-core assembling-tool around the magnetic-core assembly comprises: fitting a first compression plate alignment guide to a first compression plate of the magnetic-core assembly; attaching a plurality of semiannular tension bars to the first compression plate alignment guide, a first end of each semiannular tension bar attached to the first compression plate alignment guide; fitting a second compression plate alignment guide to a second compression plate of the magnetic-core assembly and/or within a space surrounded by the plurality of semiannular tension bars; attaching a clamping plate to the plurality of semiannular tension bars, a second end of each semiannular tension bar attached to the clamping plate.

7. The method of any preceding clause, wherein assembling a magnetic-core assembling-tool around the magnetic-core assembly comprises: attaching a plurality of semiannular tension bars to the first compression plate alignment guide, a first end of each semiannular tension bar attached to the first compression plate alignment guide; fitting a plurality of lamination stacks within a space surrounded by the plurality of semiannular tension bars; attaching a plurality of semiannular compression bars to respective ones of the plurality of semiannular tension bars, a first end of each semiannular compression bar attached to a second end of one or more of the plurality of semiannular tension bars; fitting a second compression plate alignment guide to a second compression plate of the magnetic-core assembly and/or within a space surrounded by the plurality of semiannular compression bars; attaching a clamping plate to the plurality of semiannular compression bars, a second end of each semiannular compression bar attached to the clamping plate.

8. The method of any preceding clause, wherein injecting magnet retention adhesive into a plurality of magnet retention slots in the magnetic-core assembly housed in the magnetic-core assembling tool comprises: injecting magnet retention adhesive into one or more adhesive injection ports in a compression plate of the magnetic-core assembly; and flowing the magnet retention adhesive through an adhesive conduit in the compression plate and into one or more magnet retention slots passing through a plurality of lamination stacks of the magnetic-core assembly.

9. The method of any preceding clause, further comprising: performing a machining operation on the magnetic-core assembly housed in the magnetic-core assembling tool.

10. The method of any preceding clause, wherein performing a machining operation on the magnetic-core assembly housed in the magnetic-core assembling tool comprises: passing a machining tool through an annular passageway defined by an inner surface of the magnetic-core assembling tool; and machining an inward facing surface of the magnetic-core assembly using the machining tool.

11. The method of any preceding clause, comprising: after performing the machining operation, removing the magnetic-core assembly from the magnetic-core assembling tool with the magnetic-core assembly at an ambient temperature.

12. The method of any preceding clause, further comprising: coupling a rotor shaft to the magnetic-core assembly housed in the magnetic-core assembling tool.

13. The method of any preceding clause, wherein coupling a rotor shaft to the magnetic-core assembly housed in the magnetic-core assembling tool comprises: heating the magnetic-core assembly and the magnetic-core assembling tool to a prescribed thermal expansion temperature and/or cooling a rotor shaft to a prescribed thermal contraction temperature; inserting the rotor shaft through an annular rotor shaft receiving space of the magnetic-core assembly; and removing the magnetic-core assembly from the magnetic-core assembling tool with the magnetic-core assembly and the rotor shaft at an ambient temperature.

14. The method of any preceding clause, further comprising: fabricating the magnetic-core assembling tool, wherein fabricating the magnetic-core assembling tool comprises: fabricating a first compression plate alignment guide; attaching a workpart to the first compression plate alignment guide; machining a plurality of lamination stack aligning surfaces into the workpart; and machining the workpart into a plurality of semiannular tension bars.

15. A magnetic-core assembling tool, comprising: a first compression plate alignment guide configured to be fitted to a first compression plate of a magnetic-core assembly; a second compression plate alignment guide configured to be fitted to a second compression plate of the magnetic-core assembly; a plurality of semiannular tension bars; and a clamping plate; wherein each of the plurality of semiannular tension bars comprises a first end and a second end, the first end configured to attach to the first compression plate alignment guide and the second end configured to attach to the clamping plate; and wherein the clamping plate comprises a plurality of compression shoes, each of the plurality of compression shoes configured to apply a variable amount of compression to the magnetic-core assembly.

16. The magnetic-core assembling tool of any preceding clause, wherein the first compression plate alignment guide comprises at least one alignment guide mating surface and the first compression plate comprises at least one compression plate mating surface, each of the at least one alignment guide mating surface configured to precisely mate with a corresponding one of the at least one compression plate mating surface.

17. The magnetic-core assembling tool of any preceding clause, wherein at least one alignment guide mating surface mates with a corresponding compression plate mating surface with a tolerance of from 0 to 15 mils.

18. The magnetic-core assembling tool of any preceding clause, wherein at least one alignment guide mating surface comprises an outward-facing annular mating surface and wherein at least one compression plate mating surface comprises an inward-facing annular mating surface, the outward-facing annular mating surface configured to precisely mate with the inward-facing annular mating surface; and/or wherein at least one alignment guide mating surface comprises an inward-facing annular mating surface and wherein at least one compression plate mating surface comprises an outward-facing annular mating surface, the inward-facing annular mating surface configured to precisely mate with the outward-facing annular mating surface.

19. The magnetic-core assembling tool of any preceding clause, wherein the plurality of semiannular tension bars each comprise a lamination stack aligning surface configured to precisely abut a corresponding outward facing surface of a plurality of lamination stacks of a magnetic-core assembly.

20. A magnetic-core assembly, comprising: a magnetic-core comprising a plurality of laminations clamped between a first compression plate and a second compression plate; a plurality of permanent magnets within a plurality of magnet retention slots in the laminations; and a magnet retention adhesive adhering the plurality of permanent magnets within the plurality of magnet retention slots, the magnet retention adhesive having been applied with the lamination stacks under axial compression applied by a magnetic-core assembling tool, substantially preventing magnet retention adhesive from flowing across the face of the laminations.

21. The magnetic-core assembly of any preceding clause, wherein the magnetic-core comprises a lamination factor of at least 0.9, as determined in accordance with ASTM 719.

22. The method of any preceding clause, wherein the method is performed using a magnetic-core assembling tool of any preceding clause.

23. The magnetic-core assembling tool of any preceding clause, wherein the magnetic-core assembling tool is used to assemble the magnetic-core assembly of any preceding clause.

24. The magnetic-core assembly of any preceding clause, wherein the magnetic-core assembly is assembled according to the method of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A magnetic-core assembling tool, comprising:
a first compression plate alignment guide configured to be fitted to a first compression plate of a magnetic-core assembly;
a second compression plate alignment guide configured to be fitted to a second compression plate of the magnetic-core assembly;
a plurality of semiannular tension bars; and
a clamping plate;
wherein each of the plurality of semiannular tension bars comprises a first end and a second end, the first end configured to attach to the first compression plate alignment guide and the second end configured to attach to the clamping plate; and
wherein the clamping plate comprises a plurality of compression shoes, each of the plurality of compression shoes configured to apply a variable amount of compression to the magnetic-core assembly.

2. The magnetic-core assembling tool of claim 1, wherein the first compression plate alignment guide comprises at least one alignment guide mating surface and the first compression plate comprises at least one compression plate mating surface, each of the at least one alignment guide mating surface configured to precisely mate with a corresponding one of the at least one compression plate mating surface.

3. The magnetic-core assembling tool of claim 2, wherein each of the at least one alignment guide mating surface is configured to precisely mate with the corresponding one of the at least one compression plate mating surface mate with a tolerance of from 0 to 25 mils.

4. The magnetic-core assembling tool of claim 3, wherein the tolerance is from 0 to 10 mils.

5. The magnetic-core assembling tool of claim 2, wherein at least one alignment guide mating surface comprises an outward-facing annular mating surface and wherein at least one compression plate mating surface comprises an inward-facing annular mating surface, the outward-facing annular mating surface configured to precisely mate with the inward-facing annular mating surface; and/or
wherein at least one alignment guide mating surface comprises an inward-facing annular mating surface and wherein at least one compression plate mating surface comprises an outward-facing annular mating surface, the inward-facing annular mating surface configured to precisely mate with the outward-facing annular mating surface.

6. The magnetic-core assembling tool of claim 1, wherein the plurality of semiannular tension bars each comprise a lamination stack aligning surface configured to precisely abut a corresponding outward facing surface of a plurality of lamination stacks of a magnetic-core assembly.

7. The magnetic-core assembling tool of claim 1, wherein the first compression plate alignment guide is fabricated using an additive manufacturing process, enabling precise formation of complex geometries for enhanced alignment accuracy.

8. A magnetic-core assembly assembled using the magnetic-core assembling tool of claim 1.

9. A magnetic-core assembly, comprising:
a magnetic-core comprising a plurality of laminations clamped between a first compression plate and a second compression plate;
a plurality of permanent magnets within a plurality of magnet retention slots in the laminations; and
a magnet retention adhesive adhering the plurality of permanent magnets within the plurality of magnet retention slots, the magnet retention adhesive having been applied with lamination stacks under axial compression applied by a magnetic-core assembling tool at least partially via a clamping plate and a plurality of semiannular tension bars, substantially preventing magnet retention adhesive from flowing across a face of the laminations, wherein the clamping plate is attached to the plurality of semiannular tension bars.

10. The magnetic-core assembly of claim 9, wherein the magnetic-core comprises a lamination factor of at least 0.9, as determined in accordance with ASTM 719.

11. The magnetic-core assembly of claim 9, wherein the magnetic-core assembling tool comprises:

a first compression plate alignment guide configured to be fitted to a first compression plate of a magnetic-core assembly;

a second compression plate alignment guide configured to be fitted to a second compression plate of the magnetic-core assembly;

wherein each of the plurality of semiannular tension bars comprises a first end and a second end, the first end configured to attach to the first compression plate alignment guide and the second end configured to attach to the clamping plate; and wherein the clamping plate comprises a plurality of compression shoes, each of the plurality of compression shoes configured to apply a variable amount of compression to the magnetic-core assembly.

12. The magnetic-core assembly of claim 9, wherein at least one semiannular tension bar of the plurality of semiannular tension bars includes one or more lamination stack aligning surfaces.

\* \* \* \* \*